(12) United States Patent
Murano et al.

(10) Patent No.: US 6,459,504 B1
(45) Date of Patent: Oct. 1, 2002

(54) FACSIMILE APPARATUS, FACSIMILE SERVICE CENTER APPARATUS, FACSIMILE COMMUNICATION SYSTEM, AND METHOD OF MANAGING FACSIMILE APPARATUS

(75) Inventors: Minoru Murano, Kawasaki; Seiji Miyaoka, Fujisawa, both of (JP)

(73) Assignee: Matsushita Graphic Communication Systems, Inc. (JP)

( * ) Notice: Subject to any disclaimer, the term of this patent is extended or adjusted under 35 U.S.C. 154(b) by 0 days.

(21) Appl. No.: 08/297,570

(22) Filed: Sep. 1, 1994

(30) Foreign Application Priority Data

Sep. 3, 1993 (JP) ............................................. 5-219606

(51) Int. Cl.[7] .............................. H04N 1/00; H04N 1/32
(52) U.S. Cl. ......................... 358/406; 358/434; 358/468
(58) Field of Search .................................. 358/406, 404, 358/434, 438, 439, 442, 468, 444, 1.15

(56) References Cited

U.S. PATENT DOCUMENTS

| | | | | |
|---|---|---|---|---|
| 4,432,020 A | * | 2/1984 | Onose et al. | 358/434 |
| 4,494,149 A | * | 1/1985 | Furukawa | 358/404 |
| 5,084,875 A | * | 1/1992 | Weinberger et al. | 355/205 |
| 5,196,944 A | * | 3/1993 | Satake | 358/406 |
| 5,396,342 A | * | 3/1995 | Meyer | 358/406 |

FOREIGN PATENT DOCUMENTS

| | | | | |
|---|---|---|---|---|
| JP | 22475 | * | 2/1984 | ............ H04N/1/00 |
| JP | 202966 | * | 8/1989 | ............ H04N/1/00 |

* cited by examiner

Primary Examiner—Scott Rogers
(74) Attorney, Agent, or Firm—Rossi & Associates

(57) ABSTRACT

A facsimile communication system, having a hierarchical system, comprises a central service center as the highest hierarchy, several local service centers as an intermediate hierarchy, plural facsimiles as the lowest hierarchy. The central service center manages the local service centers and fax via the local service centers through a telephone network by the pictorial communication and data communication. A user of a facsimile fills up a support service application by marking YES/NO or wiring desired data. The central service center receives the application and inputs the data to store and send the data to a local service center in charge of the facsimile. The local service center effects remote service such as storing a telephone number of one-touch dialing key with sending a panel sheet of the key, operational condition data, or a new program in attachable or stationary RAM with an operational manual to the fax and can obtain historic data of the fax such as key operations, occurrences of troubles, and use of expendables for automatically providing further service such as maintenance service or supplying of expendables. A method of managing a facsimile apparatus is also disclosed.

14 Claims, 23 Drawing Sheets

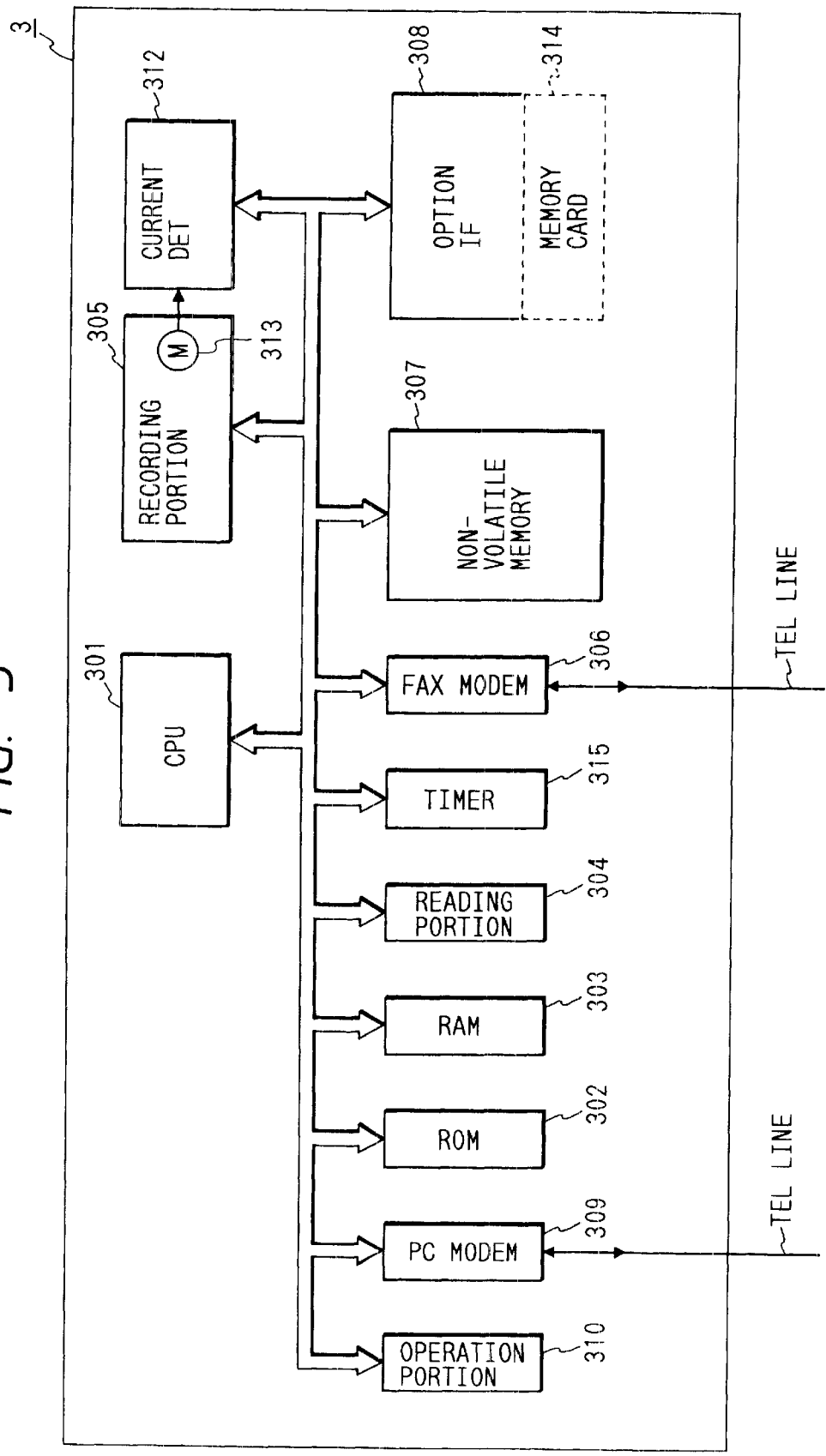

FIG. 4B

REPORT: COMMUNICATION MANAGEMENT REPORT
R1: COMMUNICATION DATE
TELEPHONE NUMBER OF THE PARTNER
COMMUNICATION TYPE AND THE NUMBER OF COPIES
COMMUNICATION RESULT
COMMUNICATION MODE
R2: COMMUNICATION DATE
    ↓
TROUBLE: TROUBLE OCCURRENCE CONDITION
T1: DATE
COMMUNICATION PARTNER'S TEL NUMBER
TROUBLE CONDITION (J1: JAM)
COMMUNICATION TYPE AND THE NUMBER OF COPIES
T2: DATE
    ↓
KEY COUNT; KEY DEPRESSION TIMES
K1: ONE-TOUCH DIAL 1
K2: ONE-TOUCH DIAL 2
    ↓

KEY OPERATION TRACE: KEY OPERATION HISTORY
K20: TEN KEY 0
K23: TEN KEY 3
K23: TEN KEY 3
K24: TEN KEY 4
K29: TEN KEY 9
K21: TEN KEY 1
K29: TEN KEY 9
K21: TEN KEY 1
K29: TEN KEY 9
K21: TEN KEY 1
K31: START
FF: (SECTIONAL CODE)
    ↓
EXPENDABLES: A COUNT OF EXPENDABLES
    ↓
P: THE NUMBER OF PRINTED COPIES
L: LENGTH OF RECORDING (mm)
N: THE NO. OF BLACK DOTS
S: TROUBLESHOOTING DATA
    ↓
OPERATION CONDITION DATA
No: DENSITY
Mo: CHARACTER SIZE
ST: TRANSMISSION COMPLETION STAMP
OPERATIONAL CONDITION OF A NEW PROGRAM
Z: ERASE CONDITION

FIG. 5

```
SUPPORT SERVICE APPLICATION

ADDRESS:
                                                            ⎫
NAME:                                                       ⎬ CONCERNED
                                                            ⎭ DATA
TEL NO. OF FAX:

CONNECTION BETWEEN TEL AND FAX:    SLAVE      SEPARATE

TEL NO. IF SEPARATE CONNECTION:

OPERATION CONDITION SETTING

DENSITY                            LOW        HIGH

CHARACTER SIZE                     SMALL      FINE

TRANSMISSION COMPLETION STAMP      YES        NO

OPTION                                                      ⎫
                                                            ⎬ DESIRED
REGISTERING AND CORRECTION OF ONE-TOUCH                     ⎭ DATA
BUTTON, SHORTENED DIALING BUTTON,
AND INITIAL SETTING                          [YES] NO

AUTOMATIC DIAGNOSTIC OF THE FAX APPARATUS     YES  NO

COMMERCIAL MESSAGE AND ORDER OF EXPENDABLE
MATERIALS                                     YES [NO]

INFORMATION OF PROGRESSIVE FUNCTIONS          YES  NO

SERVICE OF A SAMPLE OF THE PROGRESSIVE
FUNCTION                                      YES  NO

NEW PRODUCT INFORMATION                      [YES] NO

:
              :
DO YOU AGREE WITH REFERRING USER'S
COMMUNICATION REPORT FOR SERVICES?           [YES] NO
DO YOU AGREE WITH REARRANGEMENT OF
FUNCTION KEYS?                               [YES] NO
DO YOU AGREE WITH ERASING AN
INFREQUENTLY USED FUNCTION KEY?              [YES] NO
```

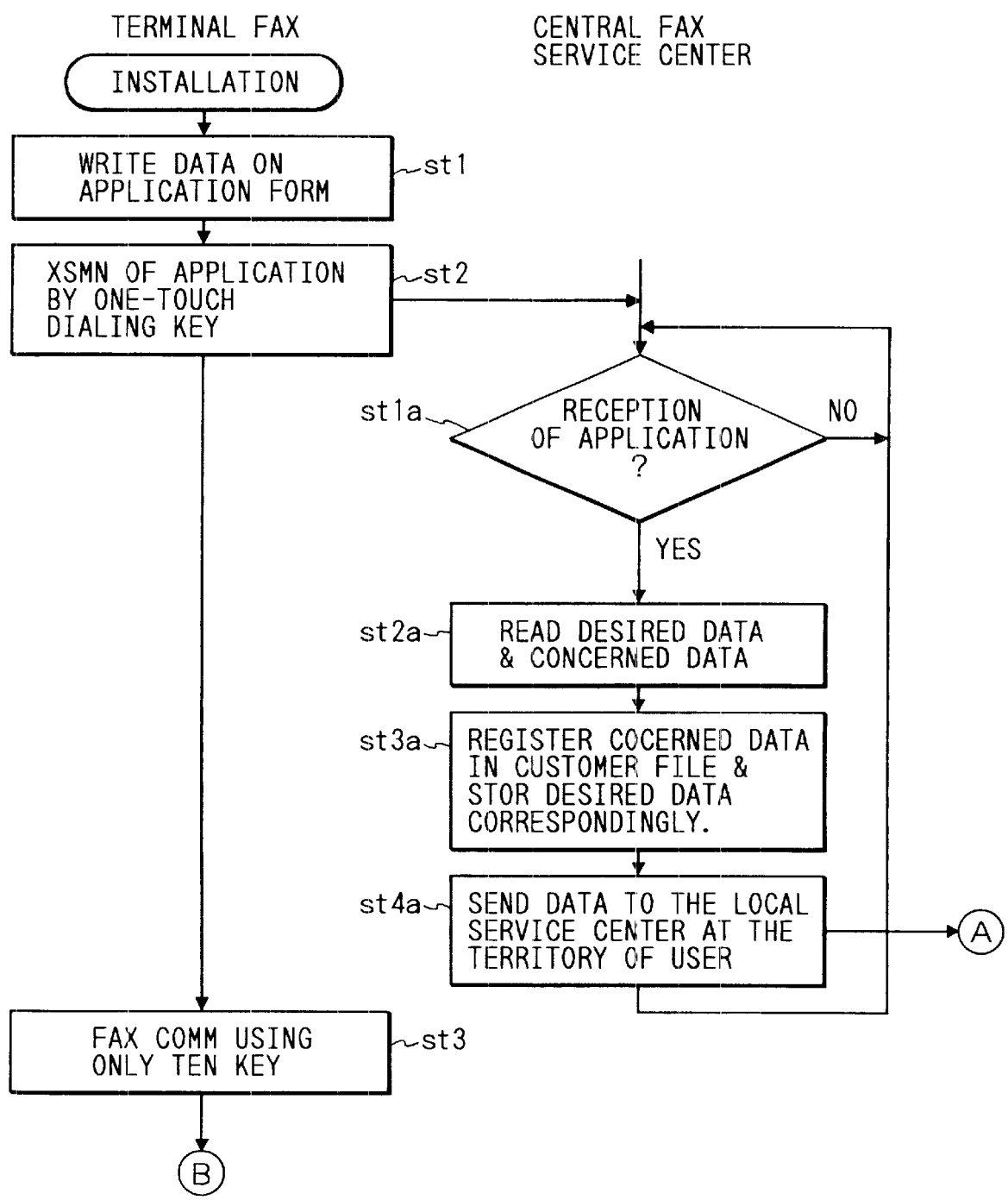

FIG. 16

| | FILE NAME | DATA | REQUIRING MEMORY CARD | REQUIRING MOUSE |
|---|---|---|---|---|
| 1 | INFO B | 5, 4, 25 | 0 | 0 |
| 2 | INFO A | 5, 5, 5 | 0 | 0 |
| 3 | PROGRAM A | 5, 6, 9 | 1 | 0 |
| 4 | PROGRAM B | 5, 7, 9 | 1 | 1 |

FIG. 18

| ONE-TOUCH DIALING BUTTON NO. | COM PARTNER'S TEL NO. | NAME | XMSN MODE |
|---|---|---|---|
| 1 | 03-1234-5678 | A FACTORY | CONTRAST : NORMAL/SIZE : FINE |
| 2 | 03-9876-5432 | B WORKS | CONTRAST : COLORED/SIZE : NORMAL |
| 3 | 03-2468-1234 | C COMPANY | CONTRAST : LOW/SIZE : VERY FINE |
| ... | ... | ... | |

FIG. 19

| | B WORKS | C COMPANY | D COR-PORATION | E OFFICE | F COR-PORATION | G WORKS |
|---|---|---|---|---|---|---|
| A FACTORY | | | | | | |
| | | | | | | |
| | | | | | | |

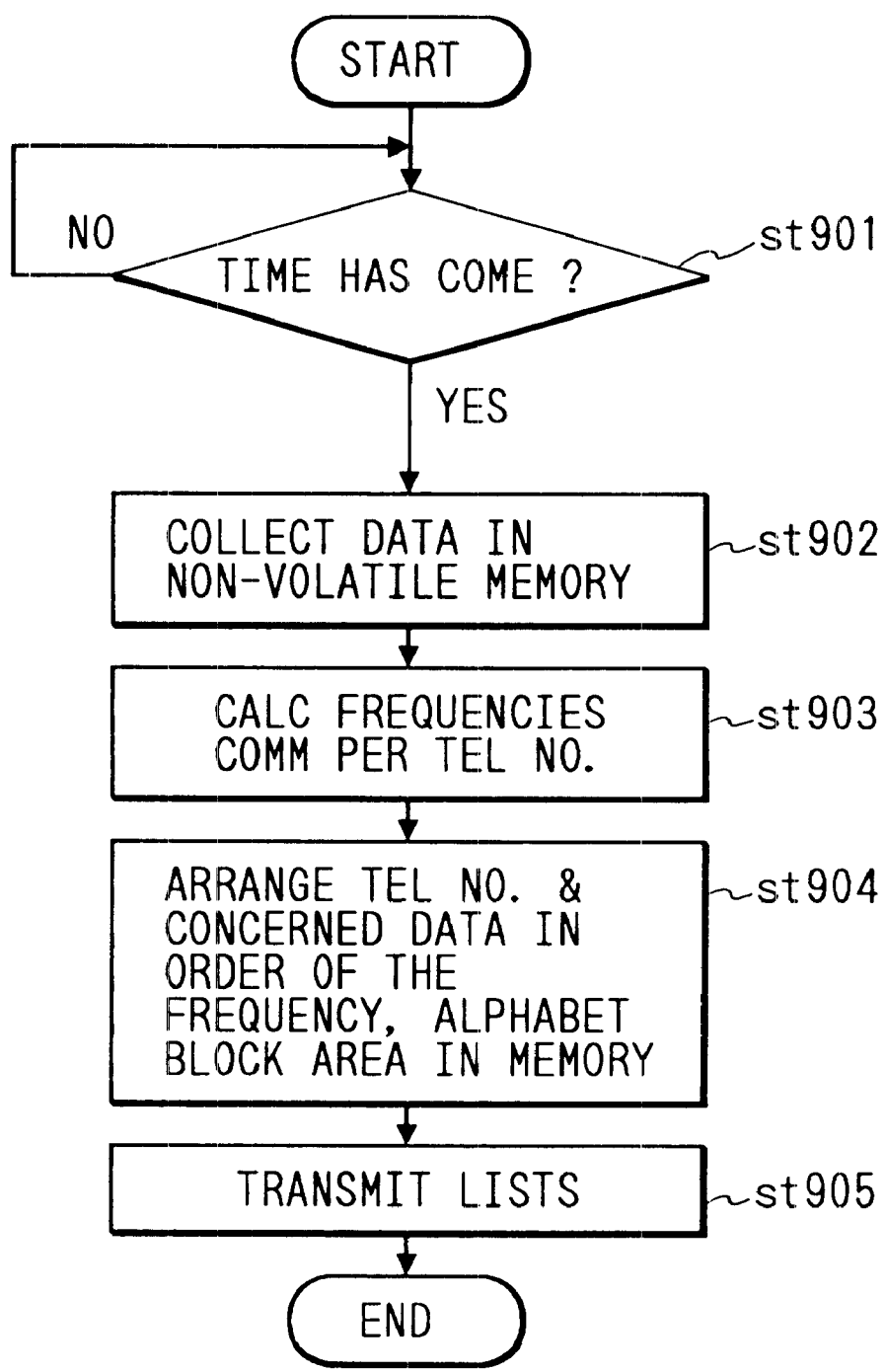

FIG. 23A

|   | COMM PARTNER | TOTAL COUNT | TEL NO. | KIND OF KEY |
|---|---|---|---|---|
| 1 | TOKYO OFFICE | 21 | 0334331111 | ONE-TOUCH DIALING KEY |
| 2 | CHIGASAKI WORKS | 15 | 0467282222 | ONE-TOUCH DIALING KEY |
| 3 | SHINAGAWA OFFICE | 10 | 0354333333 | ONE-TOUCH DIALING KEY |
| 4 | FUNABASHI BRANCH | 10 | 0474484444 | TEN KEY |
| 5 | KAWAGUCHI WORKS | 2 | 0483335555 | TEN KEY |
| 6 | NAGANO WORKS | 1 | 0268226666 | SHORTENED NO. |

FIG. 23B

|   | COMM PARTNER | TOTAL COUNT | TEL NO. | KIND OF KEY |
|---|---|---|---|---|
| 1 | CHIGASAKI WORKS | 15 | 0467282222 | ONE-TOUCH DIALING KEY |
| 2 | FUNABASHI BRANCH | 10 | 0474484444 | TEN KEY |
| 3 | KAWAGUCHI WORKS | 2 | 0483335555 | TEN KEY |
| 4 | NAGANO WORKS | 1 | 0268226666 | SHORTENED NO. |
| 5 | SHINAGAWA OFFICE | 10 | 0354333333 | ONE-TOUCH DIALING KEY |
| 6 | TOKYO OFFICE | 21 | 0334331111 | ONE-TOUCH DIALING KEY |

FIG. 23C

|   | COMM PARTNER | TOTAL COUNT | TEL NO. | KIND OF KEY |
|---|---|---|---|---|
| 5 | NAGANO WORKS | 1 | 0268226666 | SHORTENED NO. |
| 4 | TOKYO OFFICE | 21 | 0334331111 | ONE-TOUCH DIALING KEY |
| 2 | SHINAGAWA OFFICE | 10 | 0354333333 | ONE-TOUCH DIALING KEY |
| 3 | CHIGASAKI WORKS | 15 | 0467282222 | ONE-TOUCH DIALING KEY |
| 6 | FUNABASHI BRANCH | 10 | 0474484444 | TEN KEY |
| 1 | KAWAGUCHI WORKS | 2 | 0483335555 | TEN KEY |

FACSIMILE APPARATUS, FACSIMILE SERVICE CENTER APPARATUS, FACSIMILE COMMUNICATION SYSTEM, AND METHOD OF MANAGING FACSIMILE APPARATUS

BACKGROUND OF THE INVENTION

1. Field of the Invention

This invention relates to a facsimile apparatus for transmitting and receiving an image signal and receives control data through a communication line, a facsimile service center apparatus for managing facsimile apparatus, a facsimile communication system for managing the facsimile apparatus through the communication line and a method of managing a facsimile apparatus.

2. Description of the Prior Art

In a prior art facsimile apparatus and facsimile communication system, a user of the facsimile apparatus writes destination telephone numbers of one-touch dialing, identification numbers, or caller's (user's) name on a form and sends it to a service center by facsimile communication. An operator of the service center reads the form and transmits the data of the destination telephone, number data for one-tough dialing, identification number data, or data of caller's name to the facsimile to store them in the facsimile. This is disclosed in Japanese provisional patent application publication Nos. 59-95756 and 4-373257. Further, a remote diagnostic technique for obtaining communication management reports of a facsimile apparatus through the communication line by the polling receiving communication is known.

SUMMARY OF THE INVENTION

The present invention has been developed in order to remove the above-described drawbacks inherent to the conventional facsimile apparatus, facsimile service center apparatus, and facsimile communication system.

According to the invention, there is provided a service center apparatus comprising: an inputting portion for inputting control data used for a facsimile apparatus under control of the service center apparatus; a storing portion for storing the control data; and a transmission circuit for transmitting the control data to the facsimile apparatus. Therefore, the control data stored in the facsimile apparatus corresponds to the control data stored in the service center. A facsimile communication apparatus comprises the service center and the facsimile apparatus controlled by the service center. The control data may be destination telephone number data for one-touch dialing.

According to this invention, there is also provided a facsimile communication system comprising: a hierarchical system having a first hierarchy including a plurality of facsimile apparatus, a second hierarchy higher than the first hierarchy including a first service center apparatus, a third hierarchy higher than the second hierarchy including a second service center apparatus, each of the facsimile apparatus having: an image communication portion for effecting an operation of an image communication through a communication line; a first storing portion for storing data concerning to the operation of image communication; and a first data communication portion for communicating the data with the first service center through a communication line, the first service center apparatus having: a second data communication portion for communicating the data with one of the facsimile apparatus and with the second central apparatus through the communication line; and a first managing portion for managing the data in the first storing portion through the first and second data communication portions and the communication line, the second service center apparatus having: a third data communication portion for communicating the data with the first service center apparatus through the communication line; and a second managing portion for managing the first service center through the second and third data communication portions.

According to this invention, there is further provided a facsimile communication system comprising: a facsimile apparatus having: an image data communication portion for transmitting a first image signal and receiving a second image signal through a communication line; a reading portion for reading a first image to produce the first image signal; an outputting portion for outputting a second image from the second image signal from the image data communication portion; a data receiving portion for receiving first telephone number data; a storing portion for storing the first telephone number data from the data receiving portion; a dialling portion, having a key having a dimension, for dialing with the first telephone number toward the communication line in response to the key; and a service center apparatus comprising: an image receiving portion for receiving an image from the communication line; an inputting portion for inputting second telephone number data; a data transmission portion for transmitting the second telephone number from the inputting portion to store the storing portion through the communication line via the data receiving portion; an image data producing portion for producing a picture image in accordance with the dimension; and an image transmitting portion for transmitting the picture image as the second image signal to the image data communication portion to output the picture image as the second image by the outputting portion, wherein a first operator of the facsimile apparatus transmits the first telephone number data via the reading portion, an image data communication portion, the communication line, and the image receiving portion and a second operator inputs the second telephone number data by the inputting portion in accordance with the transmitted first telephone number data.

According to this invention, there is also provided a facsimile apparatus comprising: an image data communication portion for transmitting an image signal through a communication line; a reading portion for reading an image to produce the image signal; a first storing portion for storing telephone number data of a communication partner; a one-touch dialling portion, having a one-touch dialing key, for dialing with the telephone number from the first storing portion toward the communication line in response to the one-touch dialing key; a procedural portion responsive to the dialing portion for transmitting a procedural signal prior to transmitting the image by the image data communication portion to the communication partner and receiving a response signal from the communication partner including name data indicative of the communication partner; and a second storing portion for storing the name data from the procedural portion.

According to this invention, there is further provided a facsimile communication system comprising: a facsimile apparatus having: an image data communication portion responsive to a command signal for effecting communication of an image signal through a communication line; a detection portion for detecting a result as to whether or not the communication of the image signal is fail; a storing portion for storing and accumulating the result as result data; a data transmitting portion responsive to a request command for transmitting the result data; and a service center apparatus having: a data receiving portion for sending the request command and receiving the result data; and an analyzing portion for analyzing the result data from the data receiving portion.

According to this invention, there is also provided a facsimile apparatus comprising: an image data communication portion for communicating an image signal through a communication line in responsive to a command signal; an operation panel having at least a switch; a command signal producing portion for producing the command signal in response to the operation panel; a detection portion for detecting an occurrence of the command signal; and a storing portion responsive to the detection portion for accumulating the occurrence of the command signal as operational historic data. Moreover, a service center apparatus may obtain the operational historic data through the communication line and analyzes the operational historic data. Further, the service center may change the conditional data used for controlling of the image data communication portion through the communication line in accordance with the result of the analysis. Still further, the service center may change the arrangement of switches for effecting predetermined functions in accordance with the operational historic data through the communication line.

According to this invention, there is, provided a facsimile apparatus comprising: an image data communication portion for transmitting a first image signal and receiving a second image signal; a reading portion, having an optical system, for reading a first image to produce the first image signal; a testing portion for obtaining shading data of the reading portion in response to a command signal; a storing portion for accumulating a plurality,of sets of the shading data from the testing portion; a comparing portion for comparing one of the sets of shading data with another of the sets of shading data prior to the one of the sets of shading data; and a Judging portion for judging a result of the comparing portion to detect a trouble in the reading portion. In place of comparing and judging by the facsimile apparatus, a service center apparatus may receives the initial shading data and current shading data and compares them and judges the result to detects a trouble in the reading portion. Similarly, the facsimile apparatus detects a trouble of a paper jam and calculates a frequency of the paper jam. A service center apparatus may obtain the frequency of the paper jam through the communication line.

According to this invention, there is also provided a facsimile apparatus comprising: an image data communication portion for transmitting a first image signal and receiving a second image signal; an outputting portion for recording a second image from the second image signal from the image data communication portion using recording material; a first detection portion for detecting a total count of recording the second image by the outputting portion; a second detection portion for detecting whether or not the total count exceeds a predetermined value to prepare for emptying of the recording material; and a transmitting portion for transmitting a result of the second detection portion to a predetermined destination. The first detection portion may count a drive pulse for recording and the second detection portion detecting whether or not the total count exceeds a predetermined value to prepare for emptying of the recording material. The first detection portion may count the use of an expendable and informs preparation for emptying of the recording material. An order form may be transmitted from a service center apparatus in response to a request for the order form by the polling receiving communication when an expendable has been used considerably.

According to this invention, there is further provided a facsimile apparatus comprising: an image data communication portion for transmitting a first image signal and receiving a second image signal through a communication line; a first storing portion for storing a first program; a second storing portion for storing a second program; a central processor for controlling the image data communication portion in accordance with either of the first or second program; a bus line for coupling the first storing portion, second storing portion, and the central. processor; and a data receiving portion for receiving the second program and storing the second program into the second storing portion from the communication line. The second storing portion may be attachable. Therefore, the second storing portion may be omitted at an initial condition and attached later. The second program is transmitted from the service center apparatus which transmits an operational manual necessary for performing a function provided by the second program. The second program is managed by the central processor in accordance with the first program. That is, the second program is activated by the first program after transmission of the second program and the second program is erased by the first program or the service center when an erasing condition is satisfied.

According to this invention there is provided a method of managing of a facsimile apparatus having image data communication portion for transmitting a first image signal and receiving a second image signal, data receiving portion for receiving data, and storing portion for storing the data, the method comprising the steps of:

storing control data for controlling the image data communication portion;

transmitting the control data to the data receiving portion as the data to store the control data in the storing portion.

According to this invention there is provided a method of managing of a facsimile apparatus having image data communication portion for transmitting a first image signal and receiving a second image signal, data receiving portion for receiving data, and storing portion for storing the data, the method comprising the steps of:

receiving a support service application indicating control data for controlling the image data communication portion;

inputting the control data from the received support service application;

storing the inputted control data;

transmitting the inputted control data to the data receiving portion as the data to store the control data in the storing portion.

According to this invention there is provided a method of managing of a facsimile apparatus having image data communication portion for transmitting a first image signal and receiving a second image signal,data receiving portion for receiving data, and storing portion for storing the data, the method comprising the steps of:

forming a hierarchical system having a first hierarchy for controlling a plurality of facsimile apparatus, a second hierarchy higher than the first hierarchy including a first service center apparatus, a third hierarchy higher than the second hierarchy including a second service center apparatus, each of the plurality of facsimile apparatus having:

portion for effecting an operation of an image communication;

storing portion for storing data concerning to the operation of image communication, the method comprising the steps of:

managing the data in the first storing portion using the second service center via the first service center.

According to this invention there is provided a method of managing of a facsimile apparatus having image data communication portion for transmitting a first image signal and receiving a second image signal, recording portion for outputting a second image from the second image signal from the image data communication portion, data receiving portion for receiving data, storing portion for storing the data, and operation panel having an operation key, the method comprising the steps of:

receiving a support service application indicating telephone number data for making a call using the telephone number response to the operation key having a dimension;

inputting the control data from the received telephone number data;

transmitting the inputted telephone number data to the data receiving portion as the data to store the telephone number data in the storing portion, and producing a picture image including an image of the inputted telephone number data in accordance with the dimension;

transmitting the picture image as the second image signal to the image data communication portion; and outputting the picture image as the second image by the recording portion.

According to this invention there is provided a method of managing of a facsimile apparatus having image data communication portion for effecting image data communication, detecting portion for detecting a result of the image data communication, storing portion for storing the result, data transmission portion for transmitting the result, the method comprising the steps of:

receiving the result; and analyzing the result to obtain an operational condition of the facsimile apparatus.

According to this invention there is provided a method of managing of a facsimile apparatus having image data communication portion for effecting image data communication in response to an operation, detecting portion for detecting the operation, storing portion for accumulating the operation as operation historic data, data transmission portion for transmitting the operation historic data, the method comprising the steps of:

receiving the operation historic data; and analyzing the received operation historic data.

According to this invention there is provided a method of managing of a facsimile apparatus having image data communication portion for effecting image data communication in response to an operation with reference to control data, first storing portion for storing the control data, detecting portion for detecting the operation, second storing portion for accumulating the operation as operation historic data, data transmission portion for transmitting the operation historic data, the method comprising the steps of:

(a) receiving the operation historic data;

(b) analyzing the received operation historic data;

(c) data producing portion for producing second control data in accordance with a result of step of (b); and (d) transmitting and storing the second control data in the first storing portion as the first control data.

According to this invention there is provided a method of managing of a facsimile apparatus having image data communication portion for communicating an image signal through a communication line in predetermined modes in accordance with command signals; an operation panel having switches, operated by an operator; first storing portion for storing first data corresponding to the switches; command signal producing portion for producing the one of command signals in response to operated one of the switches using the first data; detection portion for detecting an occurrence of the command signals; second storing portion responsive to the detection portion for accumulating the occurrences of the command signals respectively as operational historic data; first data transmitting portion responsive to a request command for transmitting the historic data through the communication line; and receiving portion for receiving second data and storing the second data in the first storing portion as the first data, the method comprising the steps of:

transmitting the request signal to the first data transmitting portion through the communication line;

receiving the first control data from the first storing portion and the operational historic data through the communication line;

analyzing the operational historic data from the second data receiving portion;

producing a third data in accordance with a result of analyzing portion; and transmitting the third data to the first data receiving portion through the communication line as the second data.

According to this invention there is provided a method of managing of a facsimile apparatus having image data communication portion for transmitting a first image signal and receiving a second image signal, reading portion, having an optical system, for reading a first image to produce the first image signal, testing portion for obtaining a set of shading data of the reading portion in response to a command signal, and first data transmitting portion responsive to the testing portion for transmitting the set of shading data through a communication line, the method comprising the steps of:

receiving the set of shading data;

storing portion for accumulating a plurality of sets of the shading data from the first data receiving portion;

comparing one of the sets of shading data with another of the sets of shading data prior to the one of the sets of shading data; and judging a result of the comparing portion to detect a trouble in the reading portion.

According to this invention there is provided a method of managing of a facsimile apparatus having image data communication portion for transmitting a first image signal and receiving a second image signal, reading portion for reading a first image to produce the first image signal, recording portion, having a paper transporting system, for outputting a second image from the second image signal from the image data communication portion, detection portion for detecting a paper jam occurring at the paper transporting system, counting portion for counting occurrences of the paper jam, and control portion for calculating a frequency of the occurrences of the paper jam and transmitting the frequency in response to a request command, the method comprising the steps of:

receiving the frequency; and comparing the frequency from the data receiving portion with a predetermined value to detect a trouble in the paper transporting system.

According to this invention there is provided a method of managing of a facsimile apparatus having image data communication portion for transmitting a first image signal and receiving a second image signal, recording portion for recording a second image from the second image signal from the image data communication portion using recording material, first detection portion for detecting a total count of using an expendable material for the facsimile apparatus; second detection portion for detecting whether or not the total count exceeds a predetermined value to prepare for emptying of the expendable material, and transmitting portion responsive to the second detection portion for transmitting a request for an order form of the expendable material to the image data communication portion, the method comprising the steps of:

receiving the request; and transmitting the order form to the image data communication portion as the second image to record the received order form by the recording portion.

According to this invention there is provided a method of managing of a facsimile apparatus having image data communication portion for transmitting a first image signal and receiving a second image signal through a communication line, first storing portion for storing a first program, second storing portion for storing a second program, a central processor for controlling the image data communication portion in accordance with either of the first or second program, a bus line for coupling the first storing portion, second storing portion, and the central processor, and data receiving portion for receiving the second program and storing the second program into the second storing portion from the communication line, the method comprising the steps of:

transmitting the second program; and storing the second program in the second storing portion.

According to this invention there is provided a method of managing of a facsimile apparatus having image data communication portion for transmitting a first image signal and receiving a second image signal through a communication line, first storing portion for storing a first program, second storing portion for storing a second program, a central processor for controlling the image data communication portion in accordance with either of the first or second program, the first program including a start program for actuating the second program, a bus line for coupling the first storing portion, second storing portion, and the central processor, the second storing portion being attachable and removal from the bus line, and data receiving portion for receiving the second program and storing the second program into the second storing portion from the communication line and for actuating the second program using the start program, the method comprising the steps of:

transmitting the second program; and storing the second program in the second storing portion.

According to this invention there is provided a method of managing of a facsimile apparatus comprising the steps of:

storing a program;

sending the program to a facsimile apparatus, having a storing portion for storing the program for performing a function and a central processing unit for executing the program, for receiving an image signal from a communication line and reproducing the image from the image signal; and transmitting an instruction manual concerning to the function as the first image signal to reproduce the image by the facsimile apparatus.

According to this invention there is provided a method of managing of a facsimile apparatus having image data communication portion for transmitting a first image signal and receiving a second image signal through a communication line, recording portion for recording a second image from the second image signal from the image data communication portion, storing portion for storing data including a first program including a starting program, data receiving portion for receiving a second program providing an operational function from the communication line and storing the second program into the storing portion, and a central processor for controlling the image data communication portion in accordance with either of the first program or the second program, the central processor activating the second program in accordance with the starting program, the method comprising the steps of:

transmitting the second program to the data receiving portion through the communication line; and transmitting an operation manual of the operational function as the second image signal to the image communication portion through the communication line to record the operation manual by the recording portion as the second image.

According to this invention there is provided a method of managing of a facsimile apparatus having image data communication portion for transmitting a first image signal and receiving a second image signal through a communication line, storing portion for storing data including a first program including storing, starting, and erasing operations, data receiving portion for receiving and storing a second program including a predetermined operational function and erasing conditional data from the communication line into the storing portion and a central processor for controlling the image data communication portion in accordance with either of the first or second program, the central processor activating the second program in accordance with the starting program, the central processor erasing the second program in accordance with the erasing program using the erasing conditional data, the method comprising the steps of:

transmitting the second program; and transmitting the erasing conditional data.

BRIEF DESCRIPTION OF THE DRAWINGS

The object and features of the present invention will become more readily apparent from the following detailed description taken in conjunction with the accompanying drawings in which:

FIG. 3 is a block diagram of this embodiment showing a structure of each of terminal facsimiles with a remote servicing function shown in FIG. 1;

FIGS. 4A and 4B are illustrations of this embodiment showing a memory map of the CPU of the terminal fax;

FIG. 5 is an illustration of this embodiment showing a form of the support service application;

FIGS. 6 and 7 show a flow chart of this embodiment showing operations of the central fax service center and one of local fax service centers on registering the support application;

FIG. 16 is an illustration of this embodiment showing the control file;

FIG. 18 is an illustration of this embodiment showing a list of telephone numbers registered and assigned to respective one-touch dialing keys;

FIG. 19 is an illustration of this embodiment showing a printed list of communication parter names arranged correspondingly to the one-touch dialing keys;

FIG. 22 shows a flow chart of this embodiment showing a telephone number list; and FIGS. 23A, 23B, and 23C show telephone lists of this embodiment.

The same or corresponding elements or parts are designated as like references throughout the drawings.

DETAILED DESCRIPTION OF THE INVENTION

Figure 1:
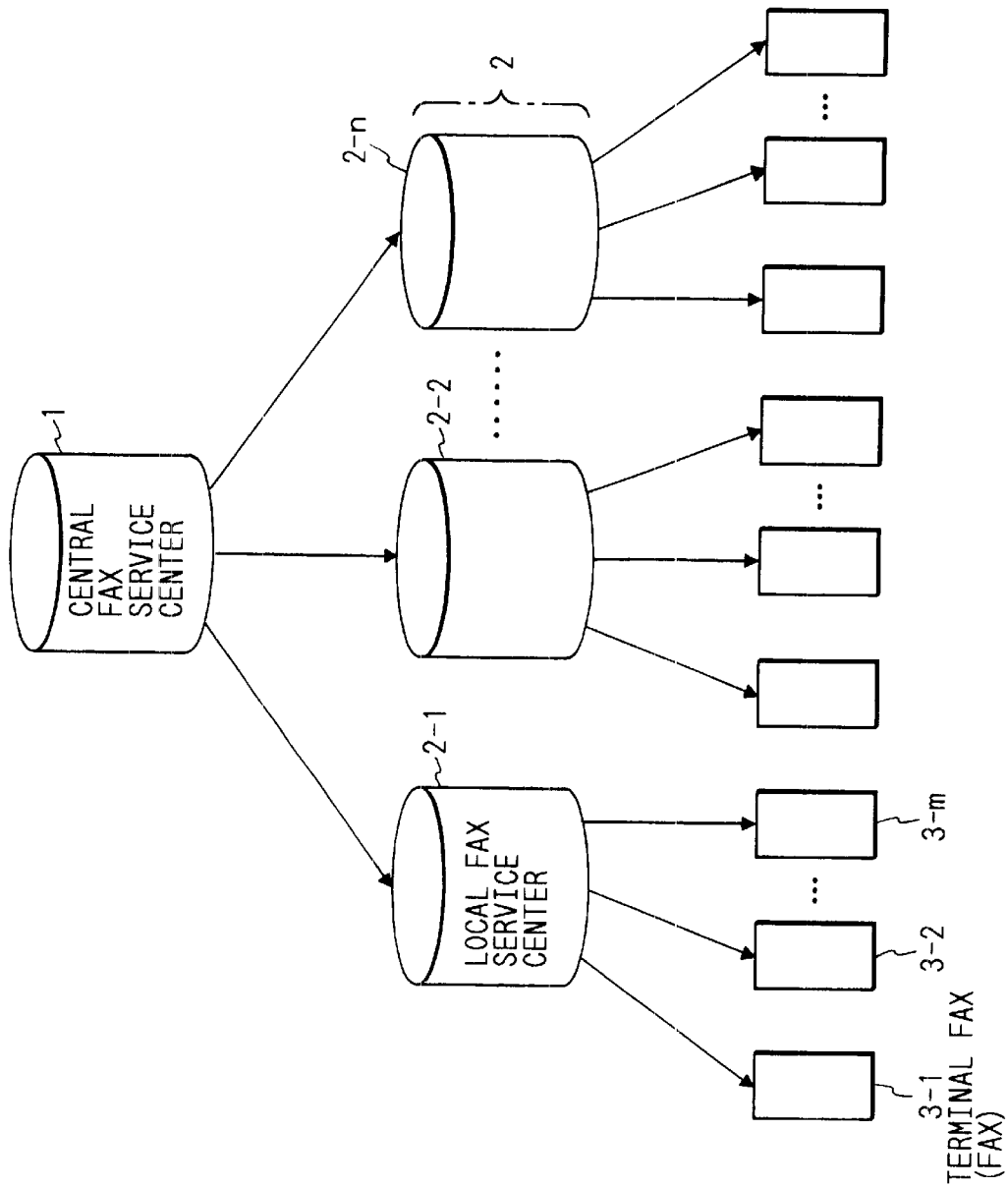
FIG. 1 is a block diagram of an embodiment of a facsimile transmission system.

Hereinbelow will be described an embodiment of this invention. FIG. 1 is a block diagram of this embodiment of a facsimile (fax) transmission system.

Numeral 1 is a central facsimile service center, numerals 2-1 to 2-n are n local facsimile service centers, and numerals 3-1 to 3-m are m fax terminals, i.e., facsimile apparatus, wherein n and m are natural numbers. The central fax service center 1 directly controls the n local fax service centers 2. That is, for example, the central fax service center 1 transmits a new control program or new information to the local fax service centers 2-1 to 2-n and receives information of service conditions of the terminal facsimiles 3 from the local facsimile service centers 2. Each of the local fax service centers 2 directly controls terminal facsimiles 3 under control by the local fax service center 2. That is, for example, each of the local fax service centers transmits the new control program or a new information received from the central fax service center 1 to the terminal facsimiles 3 and receives information such as service conditions of terminal facsimiles 3.

As mentioned above, the local fax service centers 2 are arranged dispersively such that the local fax service centers 2 controls terminal facsimiles 3 at respective local areas and there is provided the central fax service center 1 for controlling the local fax service centers 2. This hierarchy controlling structure provides an efficient control of terminal facsimiles 3.

Figure 2:
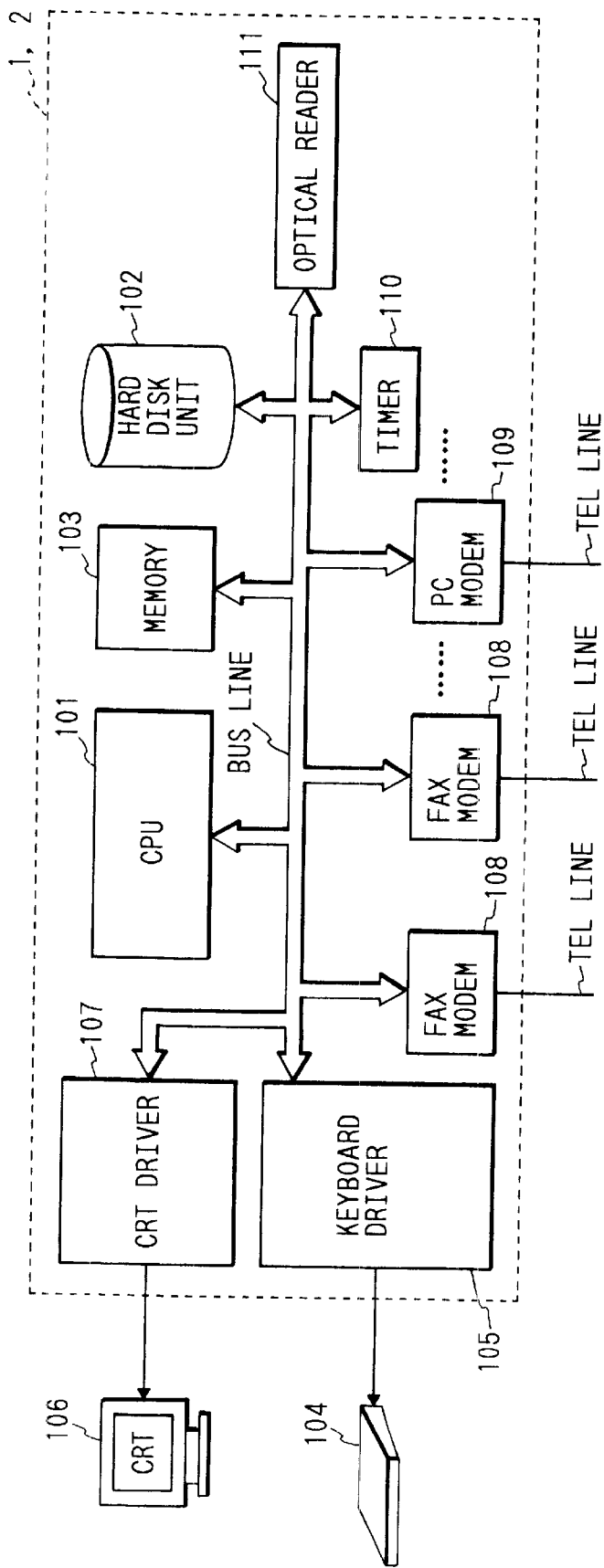
FIG. 2 is a block diagram of this embodiment showing general structures of the central fax service center and the local fax service centers shown in FIG. 1.

FIG. 2 is a block diagram of this embodiment showing general structures of the central fax service center 1 and the local fax service centers 2 shown in FIG. 1. The central fax service center 1 has substantially the same structure as the local fax service centers 2 though storing capacities of data and processing speeds of data are different therebetween. The central service center 1 or the local fax service center 2 comprises a central processing unit (CPU) 101, a hard disc unit 102 for storing data of a type, one-touch dialing telephone numbers, or the like of each of terminal facsimiles 3, and control data indicative of a registering condition of one-touch dialing buttons or the like, a memory board 103 for temporary storing data read out from the hard disc unit 102, a key board 104 for effecting various operations such as inputting the one-touch dialing telephone numbers, a keyboard driver 105 for supplying information of the various operation together width the keyboard, a cathode ray tube (CRT) 106 for displaying information such as received data from local fax service centers 2 or terminal facsimiles 3, a CRT driver for driving the CRT 106 under the control of the CPU 101, fax modems 108 for effecting a facsimile communication with other facsimile terminals 3 or other fax service centers 1 or 2, PC modems 109 for effecting data communication with other terminal facsimiles, a timer 110 for measuring time, an optical reader 111 for reading a mark sheet to input desired data or the like sent from a user of the terminal fax 3. The optical reader 111 may be provided only to the central fax service center 1.

FIG. 3 is a block diagram of this embodiment showing a structure of each of terminal facsimiles 3 having a remote servicing function shown in FIG. 1. Each of the terminal facsimiles 3 comprises a CPU 301, a ROM 302 for storing a program for effecting a general fax operations and a function receiving program, a RAM 303 for storing received pictorial information and storing a transmitted program as necessary, a reading portion 304 for reading a copy to be transmitted, a recording portion 305 for recording or outputting received information, a modem 306 for effecting the fax communication with one of the local fax service centers 2, a non-volatile memory 307 for storing information of a communication control report, a trouble occurrence condition, the number of times of depressing of an operation key, the number of a remaining expendable parts, the number of printed copies, a length of a recording paper, flags indicative of processing condition, or the like, an option interface 308 for connecting a attachable and detachable memory card 314 to the bus line of the CPU 301 as necessary, a PC modem 309 for effecting a data communication, an operation portion 310 for operating the terminal fax 3 and a current detector 312 for detecting a driving current of the paper transporting motor 313 included in a paper transporting mechanism included in the recording portion.

As mentioned above, the central or local fax service center 1 or 2 has n or m fax modems 109 and n or m PC modems and communicates with local fax service centers or terminal facsimiles 3 through the fax modem and the PC modems. Each of the terminal facsimiles 3 has the non-volatile memory 307 so as to store a service condition in a communication control report or the like. Each of local fax service centers can controlling of the terminal facsimiles 3 at the territory thereof by obtaining the information stored in the non-volatile memory 307 such as communication management reports.

Figure 4A:
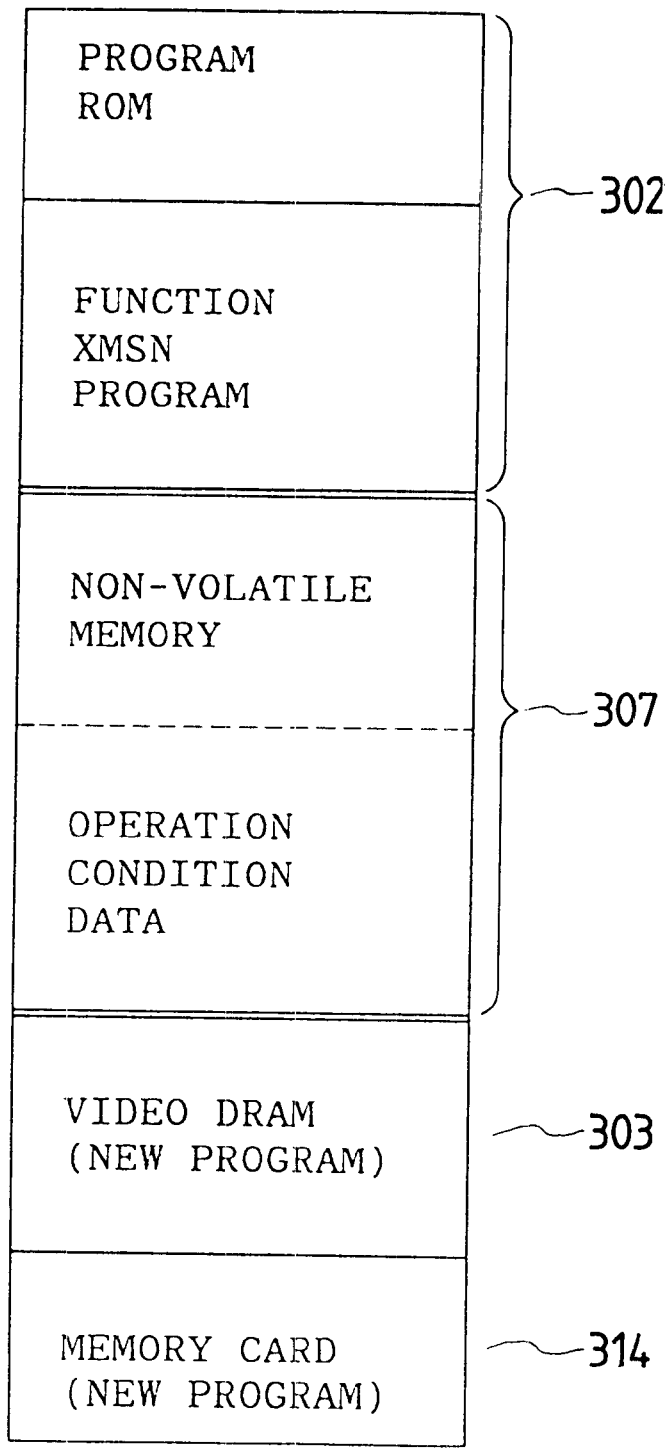

FIGS. 4A and 4B are illustrations of this embodiment showing a memory map of the CPU 301. The ROM 302 stores a program for effecting a fax operation and the function transmission program for storing a program newly developed in the RAM 303. The RAM 303 is a DRAM for storing image information for storing received pictorial information. Further, a part of the RAM 303 stores a new program transmitted from one of local fax service centers 2. The memory card 314 is attachable and stores a new programs or the like. The non-volatile memory 307 stores a communication report, a trouble occurrence condition, the number of depressing of the operation key thereof, a history of key operations, and a count of expendable parts. Further, the non-volatile memory 307 stores operation conditions such as a density of a transmitting image, a size of characters, a necessity or unnecessity of the transmission completion stamp indicative of a completion of transmission as to the sheet of transmitted copy in a transmission mode of the terminal fax 3.

The communication control report includes a communication date, a communication partner, a communication type and the number of copies, a communication result, a communication mode or the like. The trouble occurrence condition includes the date of the trouble and the trouble condition such as a jam. The key count includes the number of depression of respective keys and buttons on the operation portion of the terminal fax 3. The section of the key of trace stores a history of operations of keys and buttons on the operation portion, that is, each operations of a key or a button is stored sequentially. At the end of each communication, a section code (FF) is stored. The section of expendables includes data of the number of of printed copies, a remaining length of a roll recording paper, the number of rolls of recording paper, an amount of remaining toner in the case of a laser printer used, a remaining time interval of a photosensitive member of the terminal fax 3 or a time for replacing the cartridge. The non-volatile memory 307 stores the operation condition setting for mainly storing a density of a transmitted copies, a character size, and operation/non-operation of the transmission completion stamp.

As mentioned above, each of the terminal facsimiles 3 stores the service condition in the non-volatile memory 307 thereof, so that each of the local fax service centers 2 can be informed of the service condition of respective terminal facsimiles 3 by reading out the non-volatile memory 3 of each terminal facsimiles 3 at the territory of the local fax service center 2 through telecommunication therebetween.

On the other hand, each of the local fax service centers 2 can set respective operation conditions to the terminal facsimiles 3 through a telephone line according to a support service application. FIG. 5 is an illustration of this embodiment showing a form of the support service application.

The support service application form includes concerned data and desired data. The concerned data includes applicant's address, name, the fax telephone number, the condition of the fax apparatus, and a telephone number if the fax is connected separately. The desired data includes operation condition data of a density setting of reading operation on transmission, a character size, and discriminations in: operation of a transmission completion stamp; operation of a registering of one-touch buttons; operation of an automatic diagnostic of the fax apparatus; necessity of a commercial message and order of expendable materials; or the like. The support service application is formed of a mark sheet type, so that the fax service center automatically reads the data by an optical reading unit 111.

As mentioned, the applicant can selects the operation condition of the fax apparatus and optional services through the marking at respective answer portions easily.

Figure 7:
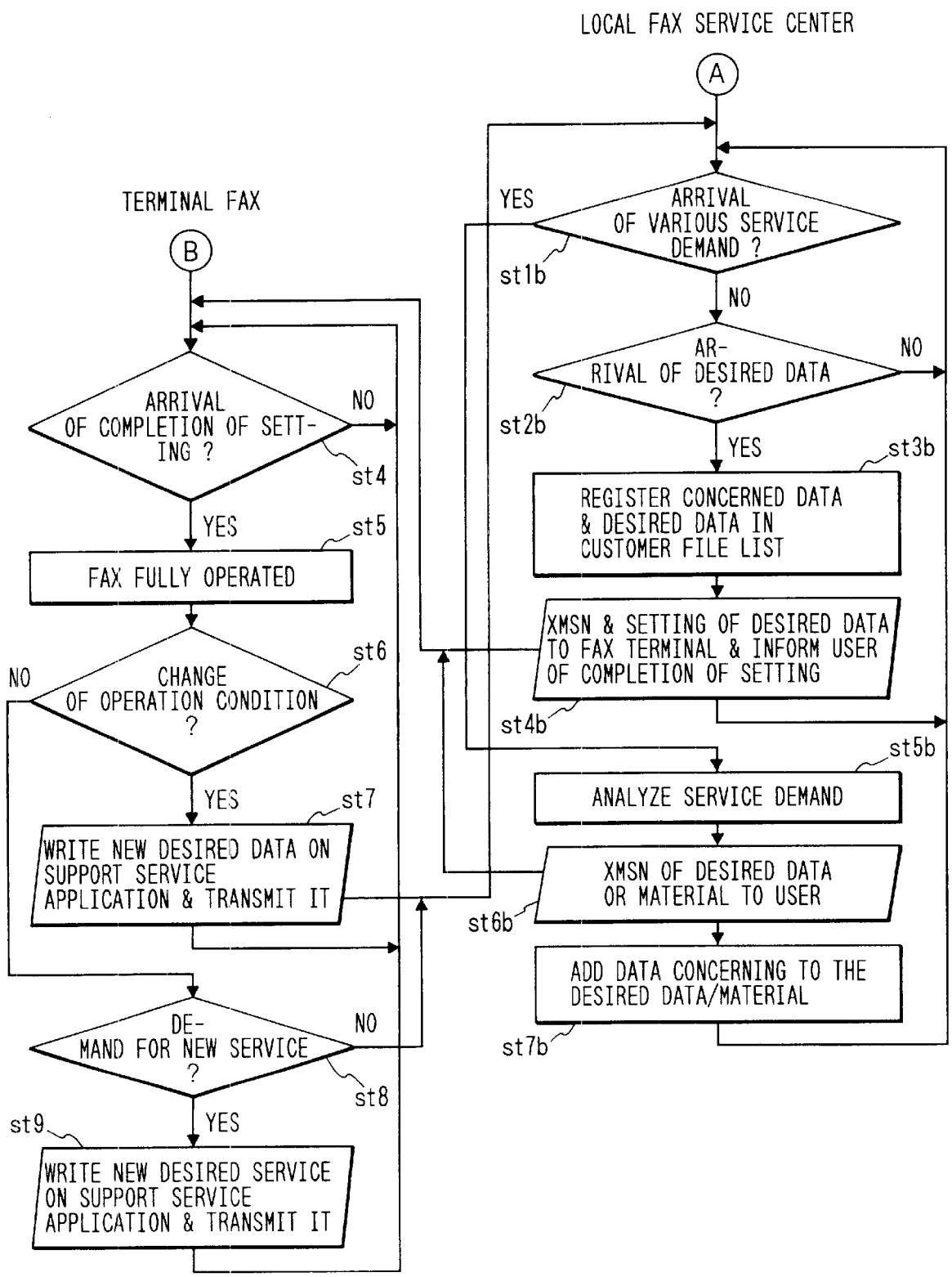

FIGS. 6 and 7 show a flow chart of this embodiment showing operations of the central fax service center 1 and one of local fax service centers 2 on registering the support application.

In step st1, a user, as an applicant, writes data of the concerned data and desired data on the support service application form which is attached to a purchased terminal fax apparatus 3. In step st2, the user transmits the support service application to the central fax service center 1 using a one-touch button provided to an operation panel of the terminal fax 3, which one-touch button was previously set at the shipment of the terminal fax 3. After this operation, the user can transmits documents using only ten-keys on the operation panel for dialing for a while in step st3.

The central fax service center 1 makes a decision as to whether or not a support service application arrives, that is, waits a support service application in st1a. If a support service application arrives, the central fax service center 1 converts the written data on the support application form of a mark sheet type into read data, namely, it reads the desired data and the concerned data by an optical reader 111 in st2a. In the following step st3a, the central fax service center 1 registers the User using the concerned data and stores the desired data correspondingly in a customer file list in a hard disc 102. In the following step st4a, the central fax service center 1 sends the desired data to the local fax service center at the territory of the user with reference to the address of the user shown in FIG. 5.

As mentioned, the central fax service center 1 receives the support service application by fax communication from the user who purchased the terminal fax 3 and forms, i.e., stores, the customer file list including the desired data and the concerned data in accordance with the received application, so that the management of the customers can be easily obtained. Further, the local fax service center 2 can obtain data of the operational condition of respective customers under the control of the local fax service center 2, so that the local fax service center 2 can provide a careful customer service, such as new information, information of expendables, operation condition setting of the terminal fax 3.

The local fax service center 2 makes a decision as to whether or not a change in the desired data or various service demands arrives from one of the terminal facsimiles 3 in step st1b. In the following step st2b, the local fax service center 2 makes a decision as to whether or not desired data arrives from the central fax service center 1. If the local fax service center 2 receives the desired data and the concerning data from the central fax service center 1, it registers the desired data and the concerned data in a customer file list thereof in step st3b. Then, the local fax service center 2 transmits the desired data mainly including data for registering of the one-touch dial service and transmits initial values for changing of expendable parts to the terminal fax at predetermined addresses of the non-volatile memory 202 in step 4b. After this, the local fax service center 2 transmits a letter of completion of setting in the same step st4b.

The desired data prepared by the central fax service center 1 is transmitted to one of the terminal facsimiles 3 through the local fax service center 2 and is stored in the non-volatile memory 307 of the terminal fax 3. That is, the desired telephone number is registered for the one-touch dialing button and it becomes a condition capable of detecting an amount of a expendable part in step st4b. Here, the one-touch dialing button "1" is changed to the dialing number of the local fax service center 2. Therefore, the terminal fax 3 can be fully operated, that is, the additional functions such as the one-touch dialing buttons are registered by the local fax service center 2. Then, the terminal fax 3 receives the letter indicative of the completion of setting from the local fax service center 2 in step st4. If a change is made for the operational condition or the optional service in step st6, the user fills up the item for change on the application and then, depress the one-touch button "1" and transmits the application to the local fax service center 2 in step st7. The local fax service center 2 executes the processing of change in the registered data in step st7 in accordance with the desired data transmitted from the terminal fax 3 directly similar to processing from step st1b to the step st4b where the operational condition data are initially set in accordance with the desired data transmitted from the central fax service center.

If the user desires a service of changing of a expendable part in place of the change of the optional condition, or desires to add a expendable part instep st8, the user fills up necessary items on the application form and transmits it with the one-touch dialing button "1" to the local fax service center 2 in charge of the terminal fax 3 in step st9.

On the other hand, an operator in the local fax service center 2 in charge of the terminal fax 3 judges this communication as an application of a service in step st1b and analyzes the desired service in step st5. In the following step st6b, the operator of the local fax service center 2 takes a necessary action. That is, if the user desires the sending of a memory card or the like, the operator of the local fax service center 2 sends a memory card through the mail in step st6b. In the following step st7b, the operator registers the sending and using of the memory card in the customer file list and returns to step st1b to receive a next communication.

As mentioned, the user who purchased the terminal fax 3 registers the operational condition in the central fax service center 1 at first. Then, the central fax service center 1 transmits the operational condition of the terminal fax 3 to the local fax service center 2 in charge of the terminal fax 3. The local fax service center 2 effects an essential manage of the terminal facsimiles 3 and the central fax service center 1 only holds the operational condition of the terminal fax 3 purchased, so that a careful service is provided to the customer.

Figure 8:
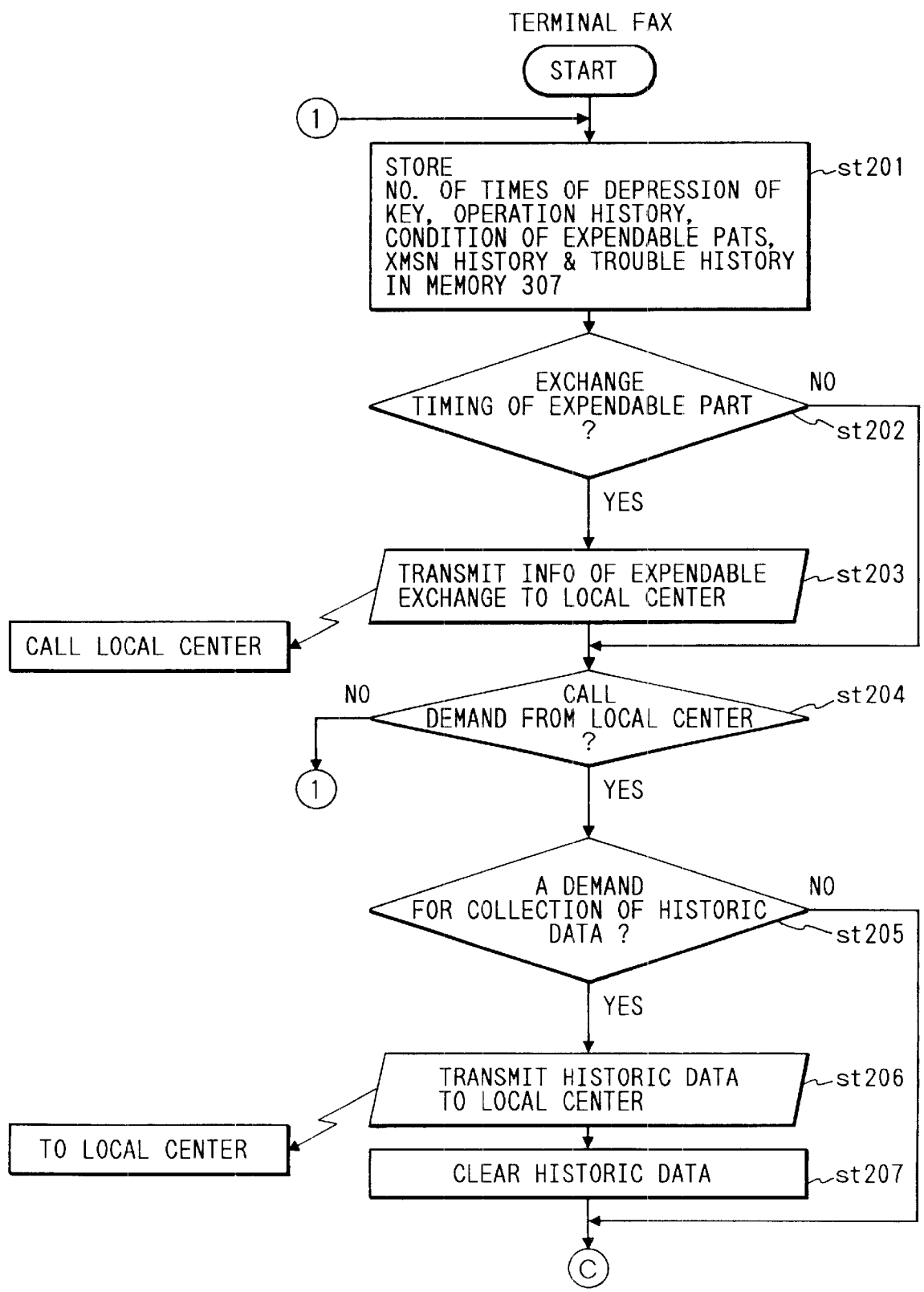
FIGS. 8 and 9 show detailed flow charts showing operations of the terminal fax in the fully operated condition.
Figure 9:
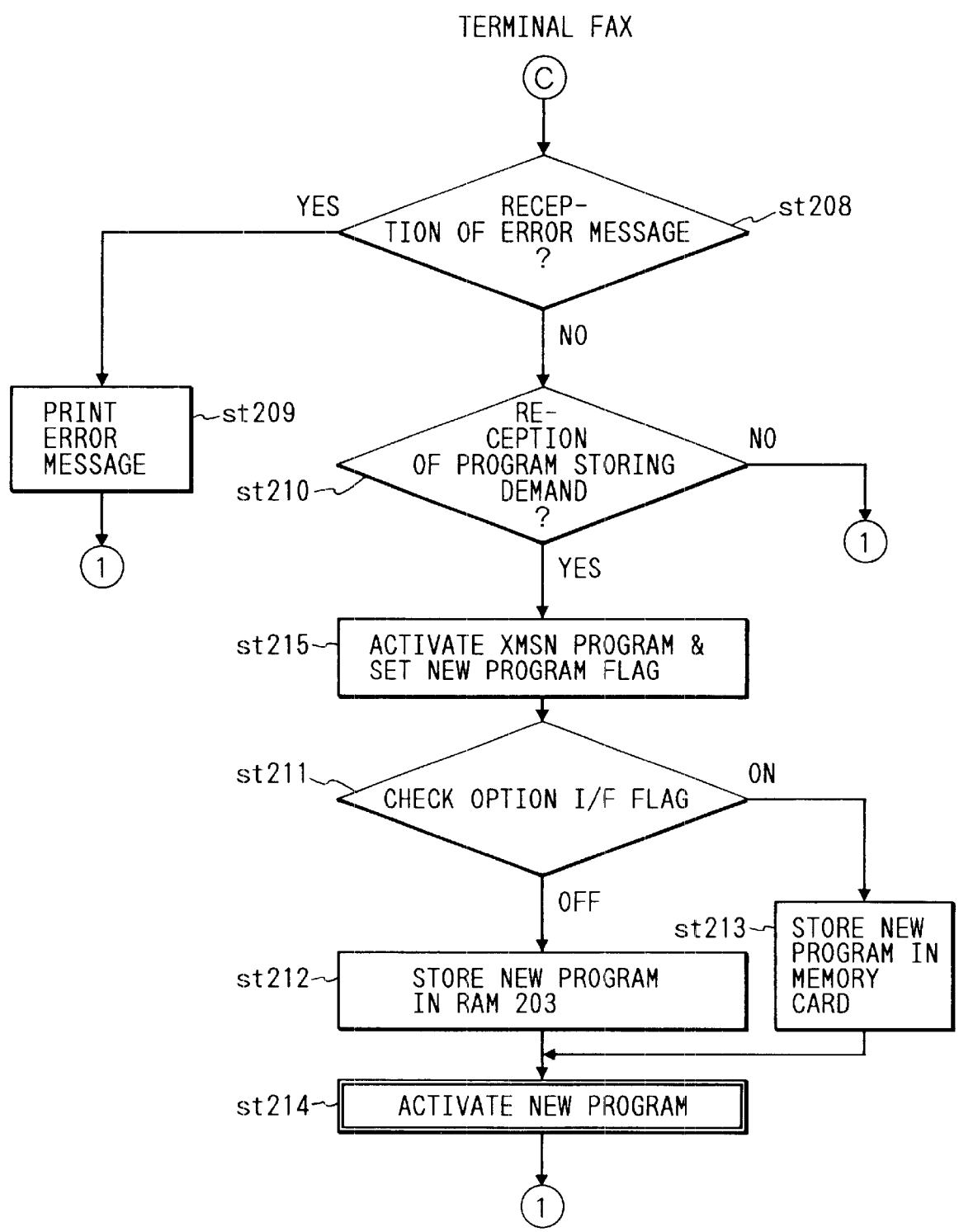

FIGS. 8 and 9 show detailed flow charts showing operations of the terminal fax 3 in the fully operated condition as shown in step st5 in FIG. 7.

In step st201, the number of times of depression of a key, an operational history, a condition of expendable parts, a transmission history, a trouble history, or the like are stored in accordance with operation conditions of the terminal fax 3 in the non-volatile memory 307. In the following step st202, a decision is made as to whether or not it is the timing of exchanging an expendable part in accordance with the number of dots printed, a capacity of toner, and the count of the expendable part shown in FIG. 4B. Here, the number of the black dots is obtained from pulses used for forming the dots and the number of the dots is converted to a value indicative of an amount of toner and then, the value is compared with the capacity of toner in a toner cartridge set thereto. If the condition of the remaining toner is little, a demand of exchange or supplying of the expendable part is transmitted to a local center 2 in step st203. Further, an order form for a toner cartridge can be received by the polling receiving communication. The user can order the toner cartridge using the order form. This embodiment is described with the example of the toner cartridges. However, this invention is applicable to other examples as follows:

An auto-document feeder separating piece at automatic paper feeding portion is exchanged with a new one in according to the number of times of transmitted copies. If the recording paper used is a roll type, a length of the recording paper used for reception of copies. If the recording papers are of plane papers, the number of printed copies is checked. An exchange demand for paper feeding rollers is made in consideration of the number of transmission of copies and a running time. Moreover, exchange timings of a separation rubber in the laser printer, LEDs in the reading unit, the transmission completion stamp can be judged from the number of sheets recorded, a running time of LEDs or the number of times of reading, and the number of times of pressing the transmission completion stamps respectively. Further, it is possible to judge an order timing of the recording paper by comparing the number of the recording papers stocked (not shown) with the number of recording papers used.

In the following step st204, a decision is made as to whether or not there are a demand for calling and a demand for collecting historic data stored in the non-volatile memory 307, such as a communication management report, a condition of trouble occurrences, the number of depression of a transmission start key, a key operation history, counts of expendable or the like in step st205. If the demand for calling is absent, processing returns to ①. If there are both demands for calling and for collecting the historic data, the historic data stored in the non-volatile memory 307 is transmitted to the local facsimile center 2 in step st206. Then, the historic data in the non-volatile memory 307 is reset in step st207. In the step 205, there is no demand for collecting the historic data in step st205, processing proceeds to the following step without transmitting the historic data through point ©.

Here, the operation of a transmitting program which requires a memory card will be described with reference to FIG. 9. After point ©, a decision is made as to whether or not an error message for requesting of inserting a memory card 314 is received from the local fax service center 2 in step st208. If there is the error message, a message "A new program cannot be transmitted because there is no memory card. Please insert a memory card" is printed out by the recording portion 305 in step st209. If the answer is NO in step st208, a decision is made as to whether or not a program storing demand is received in step st210. If there is no program storing demand in the step st210, processing returns to ①. If there is the program storing demand, the function transmission program stored in the program ROM 302 is activated and the terminal fax 3 sets a flag of a new program stored in the non-volatile memory 307 in step st215. In the following step st211, a decision is made as to whether or not a memory card is inserted to the option interface 308 by judging the option interface flag stored in the non-volatile memory 307. If a memory card has been inserted, the transmitted new program is stored in the memory card in step st213. If there is no memory card 314, the transmitted program is stored in the RAM 303 in step st212. After steps st212 and st213, the new program is activated in step st214. In step st214, the terminal fax 3 makes a judgement as to whether the new program should be activated by watching the operational conditions and a flag of the new program. The demand for collecting the historic data, a program storing demand is carried out by a non-standard protocol of the facsimile communication.

As mentioned, the new program flag for activating a new program is stored in the non-volatile memory 307 and the new program is stored in the RAM 303. Therefore, if the new program stored in the RAM 303 is erased due to a power fail, the new program can be transmitted from the local fax service center 2 again. Moreover, it is prevented to analyze the new program using a disassembler or the like.

Further, if the memory card 314 is inserted into the option interface 308, it is possible to store a new program requiring a RAM having a large capacity because the new program is stored in the memory card 314. Moreover, if there is a new program requiring the memory card, the local fax service center 2 automatically judges whether or not there is the memory card 314 in accordance with data stored in the hard disc 102 to send the memory card 314 to the terminal fax 3 by mail. The terminal fax 3 may automatically call the local fax service center 2 and requires to send the new program when the sent memory card is inserted into the option interface.

Figure 10:
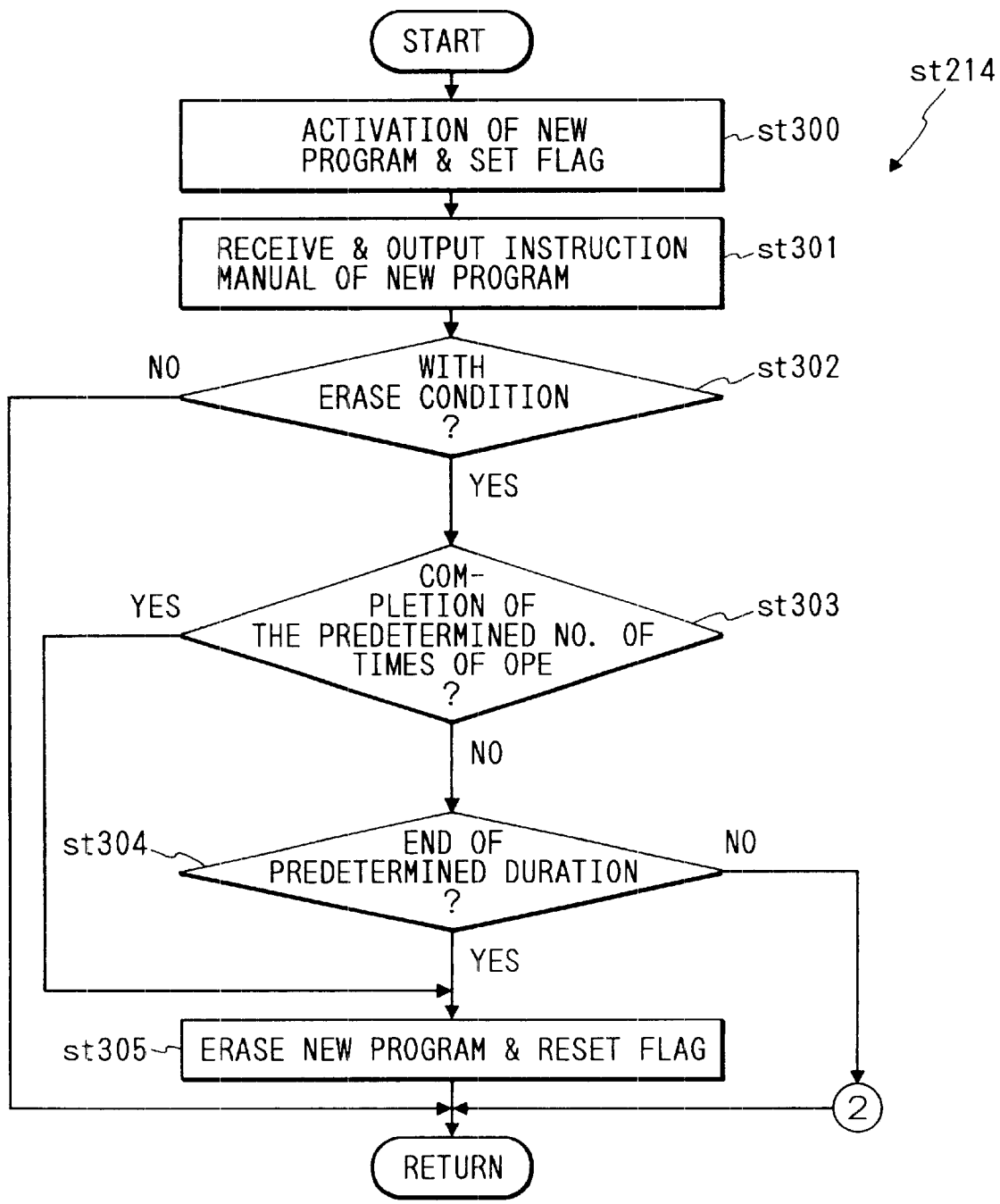
FIG. 10 shows a flow chart of this embodiment showing processing of a subroutine denoted by step st214 show in in FIG. 9.

FIG. 10 shows a flow chart of this embodiment showing processing of a subroutine denoted by step st214 shown in FIG. 9.

At first, in step st210 in FIG. 9, when a local fax service center 2 sends the new program and the new program is activated, the local fax service center 2 transmits a report of the completion of transmitting the new program, a instruction manual for operation concerning the new program, and an explanation of the function of the new program to the terminal fax 3. The terminal fax 3 receives and outputs the report of the completion of transmitting the new program, the instruction manual for operation concerning the new program, and the explanation of the function of the new program by the recording portion 305 in step st301. The operator can be informed of completion of setting the program into the terminal fax 3 by this transmission. The terminal fax 3 makes a decision as to whether or not the new program stored has an erase condition by checking an erase condition flag stored in the non-volatile memory 307 in step st302. If there is no erase condition in step st302, processing returns to the main routine shown in FIG. 9. If the answer is YES in step st302, processing proceeds to step st303 where a decision is made as to whether or not a predetermined times of operations have been finished in step st303. If the answer is NO, processing proceeds to step st305. If the answer is YES, processing proceeds to step st304 where a decision is made as to whether or not a predetermined duration of the new program has been passed. If the answer is NO, processing returns to the main routine shown in FIG. 9. If the answer is YES, processing proceeds to step st305. In step st305, the terminal fax 3 erases the new program and returns to the main routine and resets the new program flag.

As mentioned, the historic data is accumulated in the non-volatile memory 307 of the terminal fax 3 in accordance with the condition of using the terminal fax 3 and the local fax service center 2 collects the historic data from the terminal facsimiles 3. Moreover the local fax service center receives a demand for exchanging of expendable parts or demand for expendable supplies, so that appropriate service is provided to the users of the terminal facsimiles 3.

Figure 11:
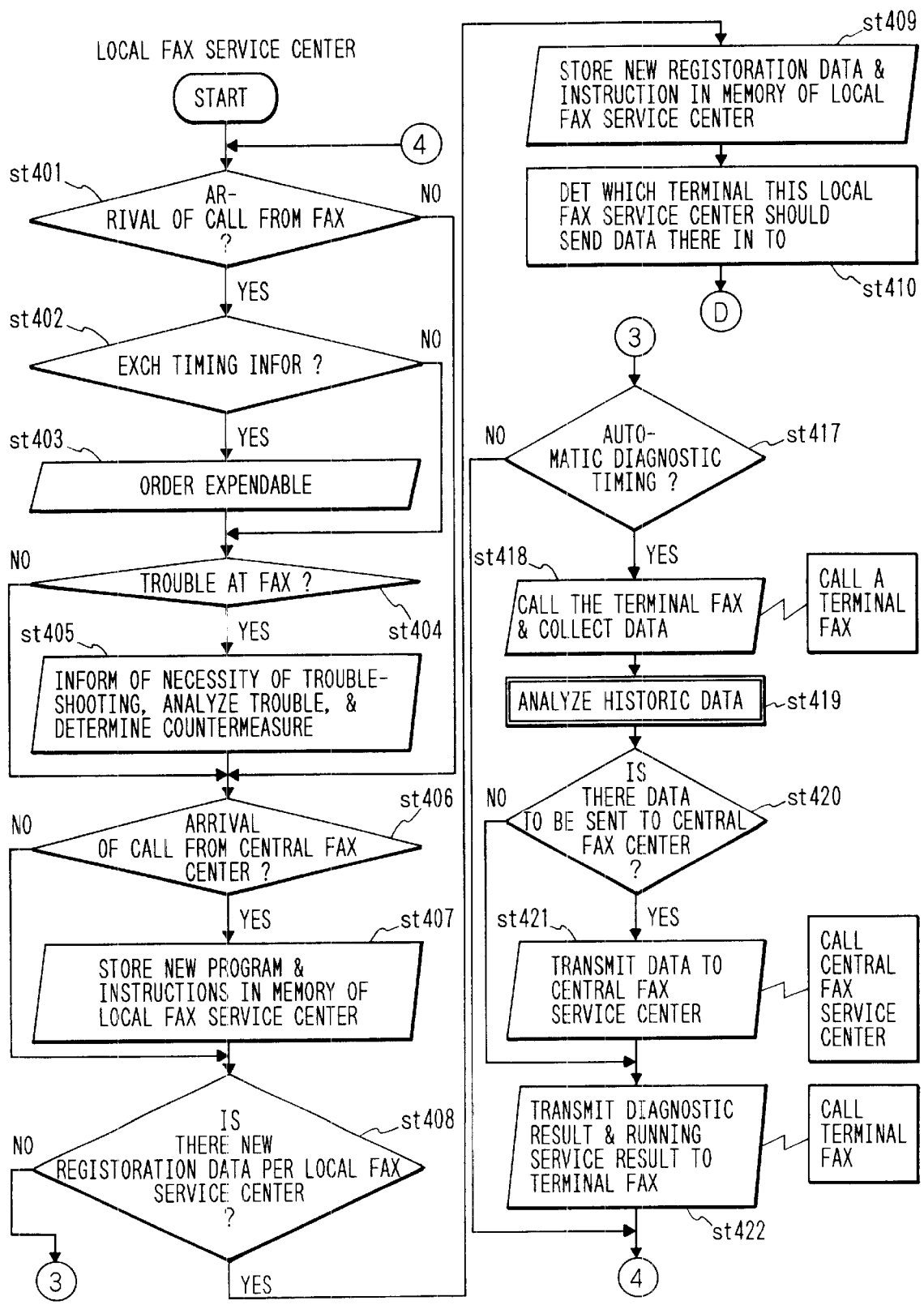
FIGS. 11 and 12 show a flow chart of this embodiment showing an operation of the local fax service center.
Figure 12:
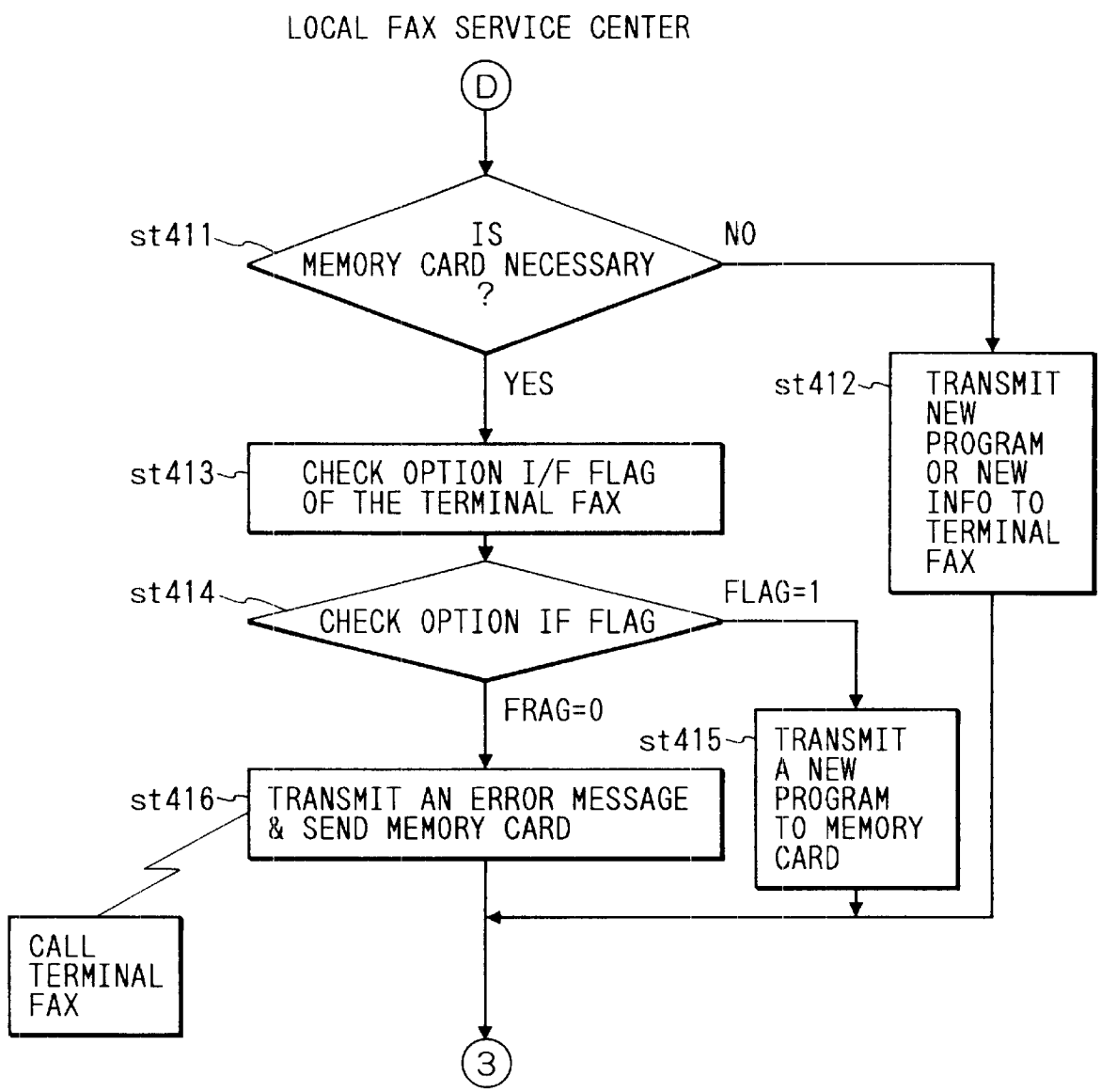

FIGS. 11 and 12 show a flow chart of this embodiment showing an operation of the local fax service center 2.

The local fax service center 2 makes a decision as to whether or not there is an arrival of a call from a terminal fax 3 in step st401. If there is an arrival of a call, a decision is made as to whether or not the call is an information of requesting of exchanging an expendable, for example, an information of requesting exchange of a toner cartridge in step st402. If the answer is YES, the local fax service center 2 orders a predetermined number of toner cartridge in the following step st403. If the terminal fax 3 is of a type effecting the thermosensitive recording, the terminal fax 3 determines the timing of supplying of new thermosensitive paper rolls in accordance with the number of rolls which was received and an amount of receiving copies (the number of sheets or a length of recording) such that there is an appropriate amount of remaining paper.

The local fax service center 2 judges whether or not there is an information of a trouble occurring at a terminal fax 3 in step st404. If there is the information of occurrence of a trouble, the local fax center 2 outputs an information to inform a service man of necessity of the trouble shooting in step st405. Further, the local fax service center 2 analyzes the trouble and determines a countermeasure. For example, if paper jam is frequent, the local fax service center 2 adds an information indicative of exchanging of the paper separator piece and a transfer roller to a list for periodical maintenance and informs a service man in charge of the terminal fax of the result. After steps st404 and st405, processing proceeds to step st406.

The local fax service center 2 makes a decision as to whether or not there is an arrival of a call from the central fax service center 1 in step st406. If there is a call from the central fax service center 1, the local fax service center 2 receives the new program and useful information transmitted from the central fax service center 1 and store the new program and useful information in the hard disc 102 in step st407. The local fax service center 2 always receives data transmission from terminal facsimiles 3 or a general facsimile, and a personal computer through a telephone line, so that it has a function of a message board. If the local fax service center receives useful information in step st408, the local fax service center 2 stores the useful information in the hard disc 102 and registers the data of the useful information in a control file in step st409. FIG. 16 is an illustration of this embodiment showing the control file. The local fax service center 2 transmits various information to respective terminal facsimiles 3. That is, the local fax service center 2 detects which terminal fax the local fax service center should send the data to in step st410. In this case, the data is transmitted only to the terminals of which users mark "YES" on the support service application, i.e., only to users who desires an information of a new program, i.e., an improved function, a service sample, a new product information.

After point Ⓓ in FIG. 12, the local fax service center 2 makes a decision as to whether a memory card is necessary for the new program or new information to be transmitted to the terminal fax 3 in step st411. The local fax service center 2 forms the control file as shown in FIG.. 16 in the hard disc 102 and the decision is made with reference to the column of "requiring a memory card". If it is not necessary to install a memory card, the local fax service center 2 transmits a new program and new information to the terminal fax without a special procedure in step st412. If it is necessary to install a memory card into the terminal fax 3, the local fax checks the flag of the option interface in the non-volatile memory 307 of the terminal fax 3 in step st414. If the memory card is not provided, that is, if the option interface flag is 0, an error message is transmitted to the terminal fax 3 and the local fax service center 2 sends a memory car to the user of the terminal fax 2 by mailing in step st416. If there is a memory card in the terminal fax 3, a new program or a new information is transmitted in step st415.

As mentioned, the local fax service center 2 transmits a new program or new information with confirming of the condition of the terminal fax 3, so that if the terminal fax has no option, for example, no memory card, the local fax service center 2 can previously sends a memory card before transmission of the new program or the new information. Therefore, there is provided a flexible service.

If the answer is NO in step st408 in FIG. 11, then, a local fax service center makes a decision as to whether or not there is any terminal fax 3 of which a time of a next periodical automatic diagnostic has come in step st417. This is done by comparing a time measured by the timer 110 with the time of the periodical automatic diagnostic stored in the hard disc 102. The time of the next periodical automatic diagnostic was determined and stored in the hard disc 102 in accordance with the date of the support service application or the date of arrival of the support service application. The time of the next periodical automatic diagnostic may be determined by the date of the recent periodical automatic diagnostic. If there is such a terminal fax 3, the local fax service center 2 calls the terminal fax 3, transmits a check program for the periodical automatic diagnostic to the terminal fax 3 from the local fax service center 2, operates the terminal fax 3 to execute the check program, and collects historic data stored in the non-volatile memory 307 of the terminal fax 3 in step st418. The check program will be described later. In the following step st418, the historic data such as the number of depression of a key, a kind of a trouble or the like is stored in the non-volatile memory 307. The local fax service center 2 analyzes the collected historic data in step st419 and makes a decision as to whether or not there is data to be transmitted to the central fax service center 1 in step st420. For example, if there is data indicative of frequency of depression of a specific key, the local fax service center 2 transmits the data to the central fax service center 1 in step st421. That is, the local fax service center 2 detects the kind of data and makes a decision as to whether or not the date should be transmitted to the central fax service center 1. In the following step st422, the local fax service center 2 transmits a result of diagnostic of the mechanism of the recording portion 111, and a running service result concerning to communication fees.

As mentioned, the local fax service center 2 always detects an external coming access and executes a processing in accordance of the demands. Moreover, the local fax service center 2 can always provides data obtained by the local fax service center to the central fax service center 1 and can utilize the data for services by periodically accessing to the terminal facsimiles 3 at the periodical automatic diagnostic and to the central fax service center 1. Further the central fax service center 1 can obtains useful information for designing a new products such as the data indicative of a frequency of depression of a key.

Figure 13:
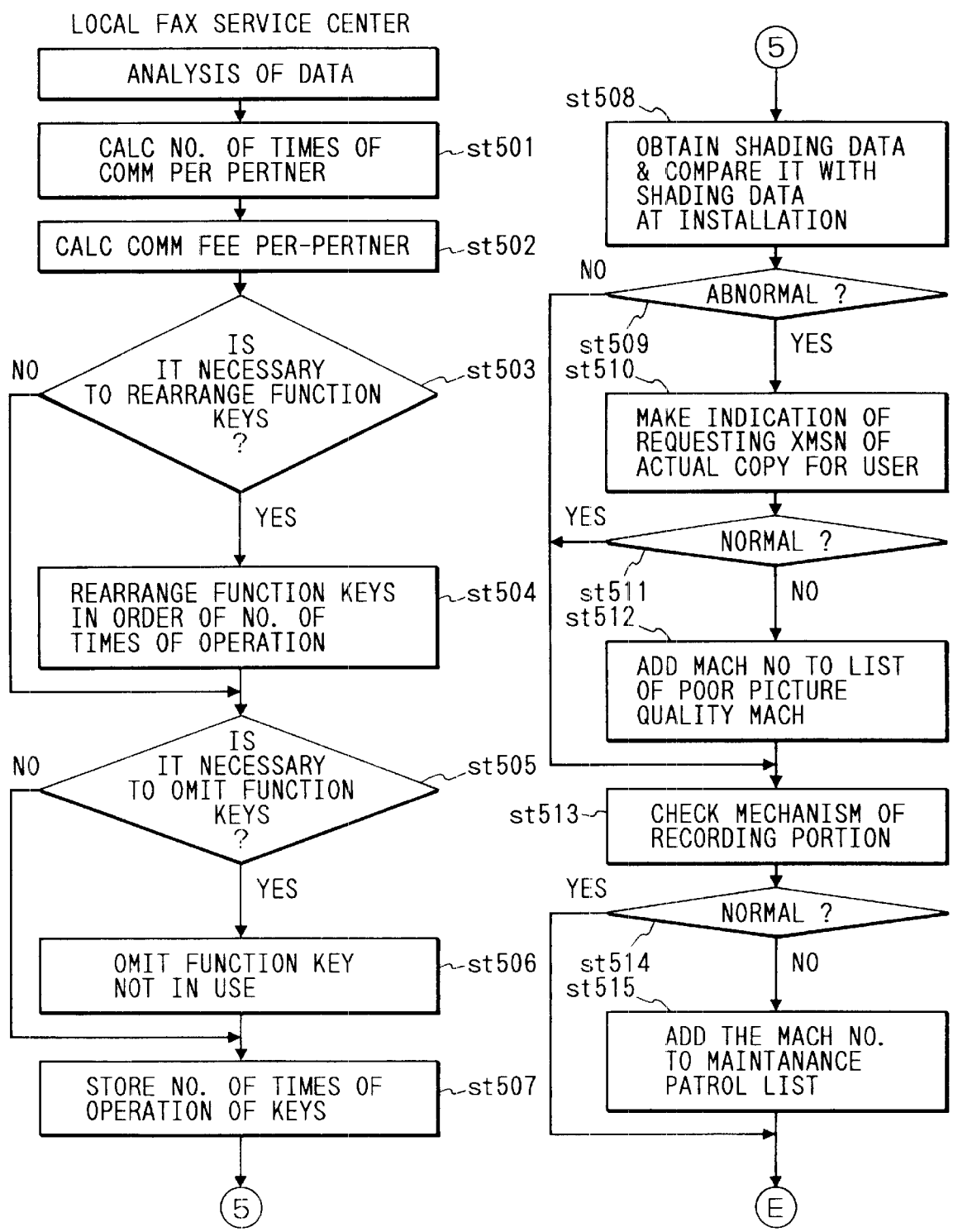
FIGS. 13 and 14 show a flow chart of this embodiment showing an operation of the analysis of the historic data in step st419 shown in FIG. 11 executed by the local fax service center.
Figure 14:
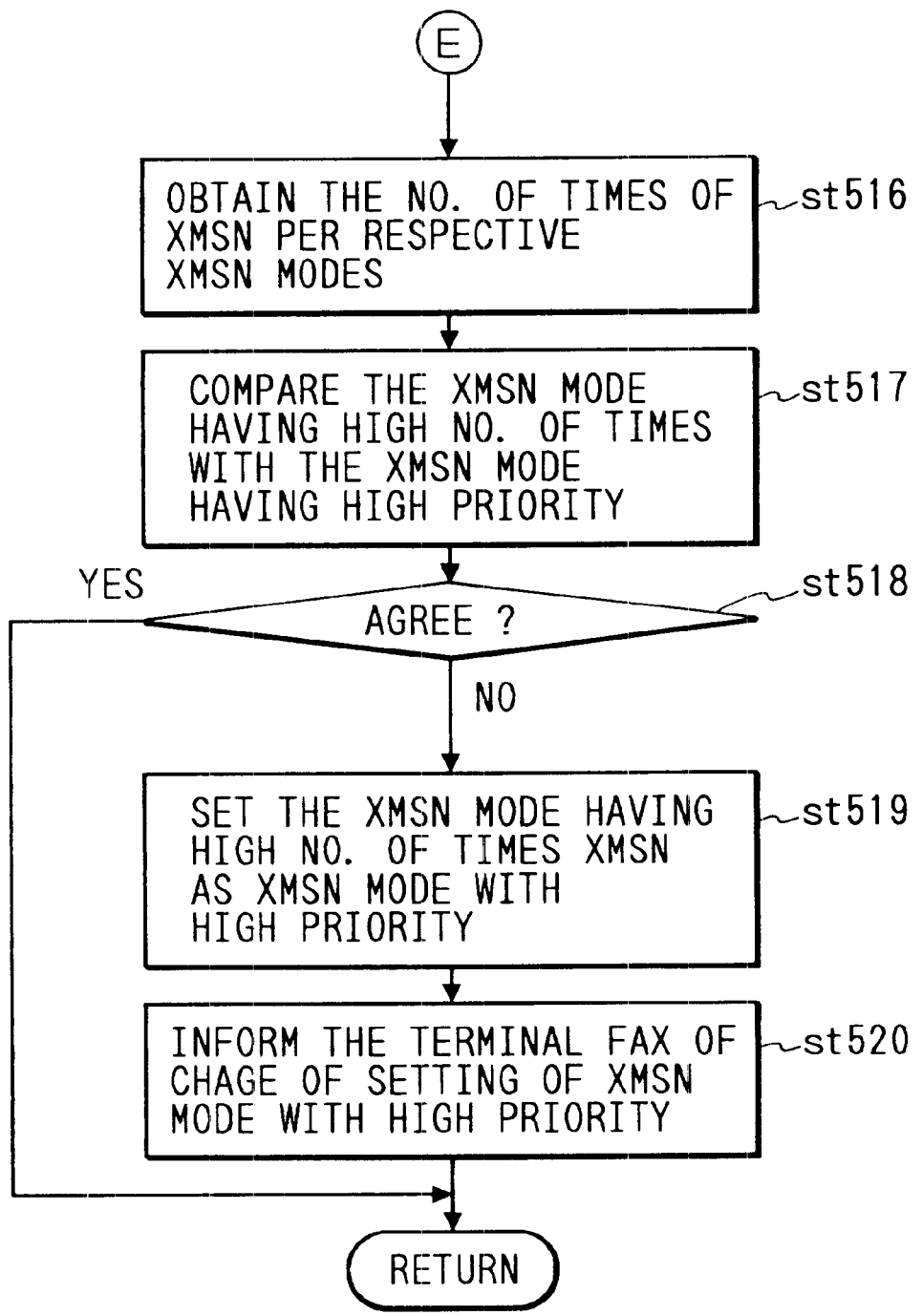

FIGS. 13 and 14 show a flow chart of this embodiment showing an operation of the analysis of the historic data in step st419 shown in FIG. 11 executed by the local fax service center 2.

The local fax service center 2 obtains data of the communication management report stored in the non-volatile memory 307 of the terminal fax 3 under communication through the PC modem 109. Then, the local fax service center 2 calculates the number of communications per a communication partner in step st501 and calculates communication fees per a communication partner in step st502 from the data obtained from the terminal fax 3. The local fax service center 2 makes a decision as to whether or not a rearrangement of function keys should be done in accordance with the data obtained from the support service application transmitted from the terminal fax 3 at installation of the terminal fax 3 in step st503. If the rearrangement of the function keys is to be done, the local fax service center 2 checks the number of times of depression of function keys in the historic data and rearranges the function keys in order of the number of operations of function keys on the operation panel of the operation portion 310 in step st504. Moreover, the local fax service center 2 makes a decision as to whether or not omission of a key should be done in accordance with the data of the support service application. If the omission should be done, function keys which have not been used or will not be used, the local fax service center 2 determines which function key should be omitted and transmits a new setting data of the function keys to the terminal fax 3 in step st506. The local fax service center 2 stores the number of times of operation of keys and the setting data of the function keys. The terminal fax 3 sets the setting data of the function keys transmitted from the local fax service center 2 and changes indication of the function keys in accordance with the setting data.

The check program will be described.

In step st508, the terminal fax 3 obtains shading data by scanning a plate, having a predetermined reflectivity, which may be set manually or automatically and compares the obtained current shading data with the shading data obtained at the installation of the terminal fax 3 stored in the non-volatile memory 307 of the terminal fax 3. In the following step st509, a decision is made as to whether or not the current shading data is abnormal. If the current shading data is abnormal in consideration of the shading data at the installation, processing proceeds to step st510 and if the current shading data is normal processing proceeds to step st513. For example, if differences between the current shading data and corresponding shading data at installation exceed a predetermined value, the current shading data is judged as abnormal. Here, this judgement is carried out by the local fax service 2 by receiving shading data at the installation and the current shading data. However, it is also possible to effect this judgement by the terminal fax 3 itself. In step st500, through the terminal fax 3, the local fax service center 2 informs the user of requesting a fax transmission of an actual copy, or a standard test pattern copy to the local fax service center 2 using the indicator on the operation portion 310 of the terminal fax 3. When the user send an actual copy, the local fax service center analyzes the transmitted copy and sends the results. The terminal fax 3 receives the result of the fax transmission of the actual copy or the standard test pattern from the terminal fax 3 in step stl0. In the following step st11, a decision is made as to whether or not the result shows that the transmitted actual copy is normal. If the answer is YES, processing proceeds to step st513. If the answer is NO, that is the result shows the transmitted actual copy is abnormal, processing proceeds to step st512. In step st512, the local fax service center 2 adds the machine number of the terminal fax 3 to a list of poor picture quality machine, i.e., a terminal fax 3 which transmits copies in a poor quality, in order to cause a service man to clean an optical system of the reading portion 304. This provides a cleaning service of the optical system of the reading portion 304, by the service man at the next maintenance patrol. At the maintenance service, the service man sends new shading data after cleaning of the optical system of the reading portion 304. Thus, the local fax service center stores the new shading data, so that the shading data at the installation and cleaning are accumulated in the hard disc of the local fax service center 2. This provides data of a secular change in the optical system of the reading portion 310 which can be utilize the designing of a new product. If the service man replaces a part of the optical system of the reading portion 304, the service man informs the local fax service center 2 of changing the part of the optical system, the shading data is renewed.

In the following step st513, the local fax service center 2 operates the terminal fax 3 to check:the mechanism of the recording portion 311 in step 513. The local fax service center 2 reads present data of the drive current of the paper transporting motor 313 by reading data from the current detector 312 through the PC modems 109 and 309. The local fax service center 2 compares the data of the drive current at the installation. In the following step st514, a decision is made as to whether or not the present drive current is normal in consideration of the data of the drive current at the installation. If the answer is YES, processing proceeds to point E. If the answer is NO, the local fax service center 2 adds the machine number of the terminal fax 3 to a maintenance patrol list to perform an inspection of the paper transporting motor 313. For example, if differences between the present data of the drive current and corresponding data at installation exceed a predetermined value, the present data of the drive current is judged as abnormal. The local fax service center 2 adds the request by the terminal fax to the troubleshooting list managed by the local fax service center 2. At the maintenance patrol, the service man will be informed of the trouble at the paper transporting motor 313 by the trouble shooting list, so that the service man troubleshoots. After processing of step st515, processing proceeds to point E.

The local fax service center 2 obtains the number of times (total) of transmission per respective transmission modes such as a fine transmission mode, a half tone transmission mode or the like from the history of key operation and the transmission management report stored in the non-volatile memory 307 through the PC modem 109 and 309 in step st516. The number of times may be converted into frequency using a running time measured by a timer 315 in the terminal fax 3 or the timer 110 in the local fax service center 2. In the following step st517, the local fax service center 2 compares the transmission mode having high number of times of transmission with the transmission mode having a high priority which is normally set in the terminal fax 3 or can be performed with only depressing a start key. In step st518, the local fax service center 2 makes a decision as to whether or not the transmission mode having a high number of times of transmission agrees with the transmission mode having a high priority. If there is agreement, no processing is executed and returns to the main routine. If there is disagreement, the local fax service center 2 sets the transmission mode having the high number of times of transmission as transmission mode having a high priority in step st519. In the following step st520, the local fax service center 2 informs the terminal fax of changing of setting of transmission mode with a high priority and then, processing returns to the main routine. The transmission having the highest priority is initially set without operation of key switch except the start switch. This mode is also set from another mode if there is no switch operation during a predetermined interval measured by the timer 315.

As mentioned, the local fax service center 2 obtains total of data and renew data and stores these data in the hard disc 102. Moreover, the local fax service center 2 checks conditions of the reading portion 304 and the recording portion 311 and if there is a trouble, the local fax service center 2 informs a service man of a troubleshooting, so that a favourable operating condition of the terminal fax 3 is provided for the user.

Figure 15:
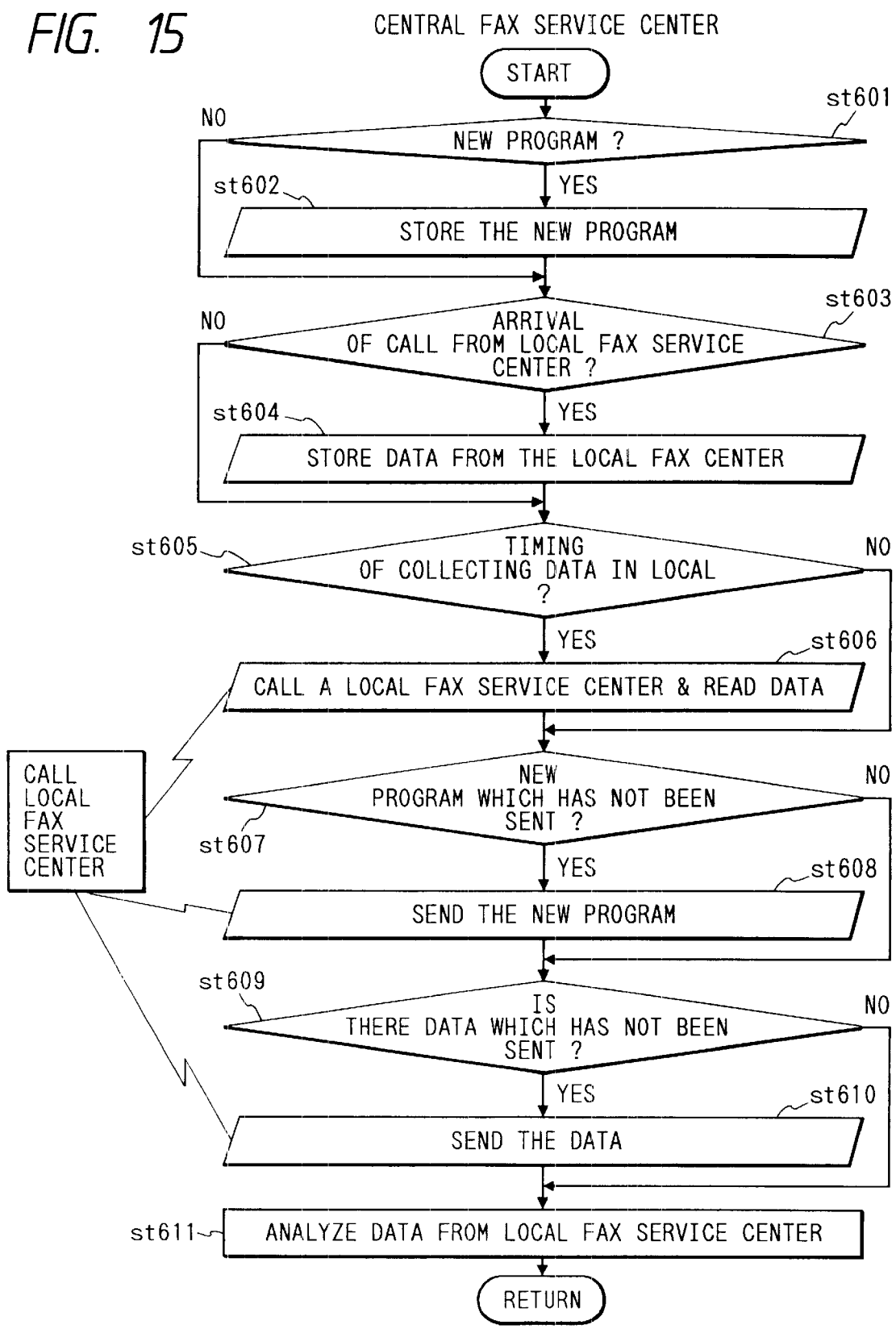
FIG. 15 shows a flow chart of this embodiment showing an operation of the central fax service center.

FIG. 15 shows a flow chart of this embodiment showing an operation of the central fax service center 1. In step st601, the central fax service center 1 makes a decision as to whether or not there is a new program to be stored. If the answer is YES, processing proceeds to step st602 and if the answer is NO, processing proceeds to step st603. In step st602. the central fax service center 1 stores the new program in the hard disc 102 to prepare for transmission of the new program to a local fax service center 2. In step st603, the central fax service center 1 makes a decision as to whether or not there is an arrival of a call from a local fax service center 2. If the answer is YES, the central fax service center 1 receives and stores the historic data of the terminal facsimiles 3 stored in the hard disc 102 of a local fax service center 2 and transmits changed desired data of a terminal fax 3 stored in the central fax service center 1 to the local fax service center 2 in charge of the terminal fax in step st604 and processing proceeds to step st605. If the answer is NO in step st603, processing proceeds to step st605 also. In step st605, the central fax service center 1 makes a decision as to whether or not a timing of collecting historic data stored in the hard disc 102 of a local fax service center 2 has come in step st605. If the timing has come, the central fax service center 2 calls a local fax service center 2 and operates the local fax service center 2 to transmit historic data of terminal facsimiles 3 to the central fax service center 1 or transmits changed desired data which was written in the support service application in step st606. In the following step st607, a decision is made as to whether or not there is a new program which has not been sent to the local fax service center 2. That is, the central fax service center 1 has a list of the new programs and the list has data per each of new programs indicating whether or not respect local fax service centers 2 receives the new program. If the answer is YES, the central fax service center 1 sends the new program to the local fax service center 2 in step st608 and processing proceeds to step st609. If the answer is NO in step st607, processing proceeds to step st609 directly. In step st609, a decision is made as to whether or not there is data which has been sent. That is, the central fax service center 1 has a list of data and the list has information per each of data indicating whether or not respect local fax service centers 2 receives the data. If the answer is YES, the central fax service center 1 sends the data to the local fax service center 2 in step st610 and processing proceeds to step st611. If the answer is NO, processing directly proceeds to step st611 from step st609. in step st611, the central fax service center 1 analyzes the data obtained from the local fax service centers 2 and provides statistic data to the operator of the central fax service center 1 which will be useful for designing of a new product. Therefore, the manufacture of the terminal fax 3 can obtain useful data useful and can feedback the data in the designing of a new product which are suited for the users' demands. For example, the statistic data indicative of the number of times of operation of a function key provides a decision as to whether or not a function key which is not frequently used should be omitted. For example, a function key for effecting LCR (least cost routing) may be omitted.

As mentioned, the central fax service center 1 can indirectly control the terminal facsimiles 3 which are under control of the local fax service centers by that the central fax service center 1 transmits new programs and new data to the local fax service centers 2 continuously. This provides a statistic data which is useful for designing a new model.

Figure 17A:
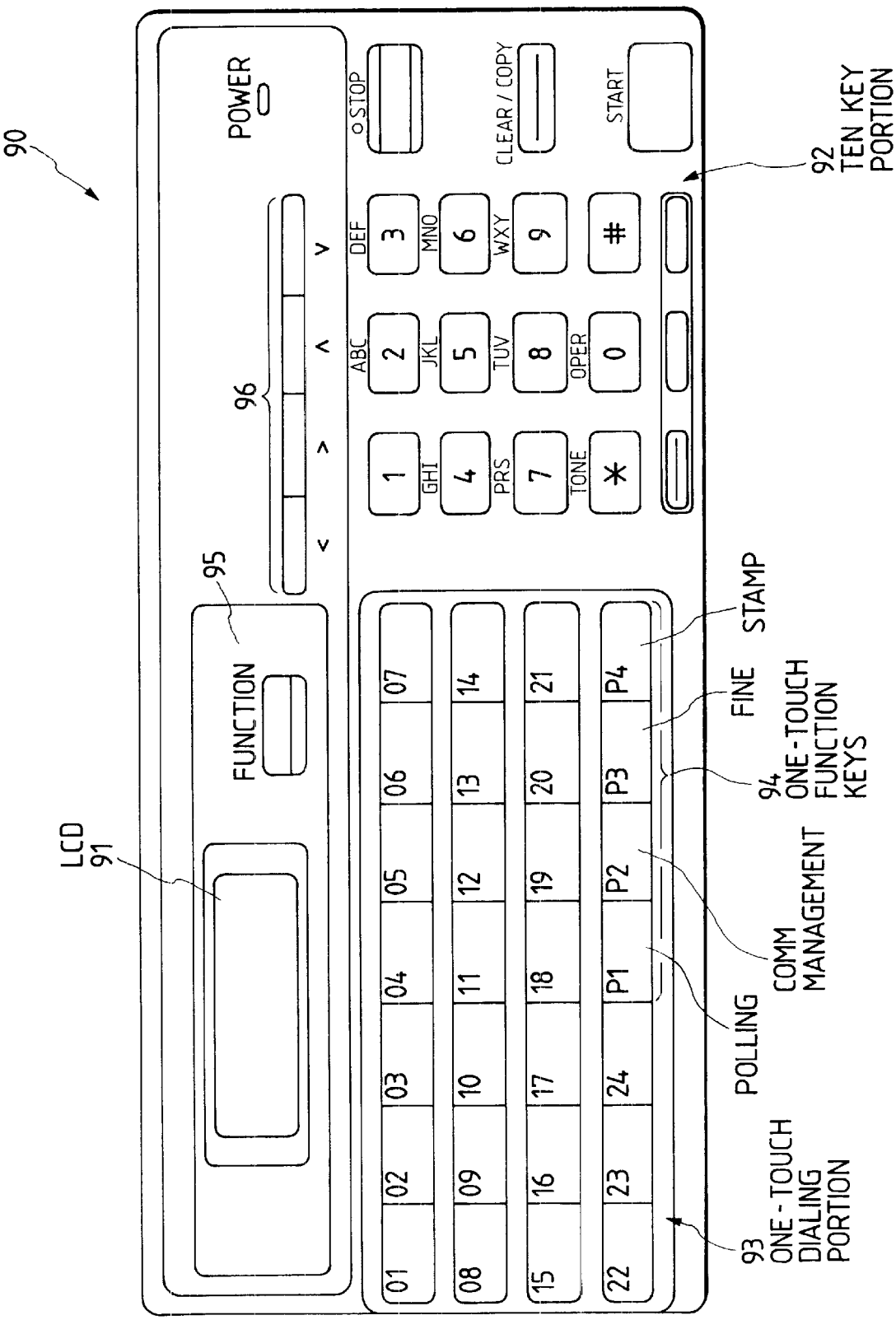
FIGS. 17A and 17B are illustrations of this embodiment showing an operation panel included in the operation portion 310 shown in FIG. 3 in the initial condition and a modified conditions respectively.
Figure 17B:
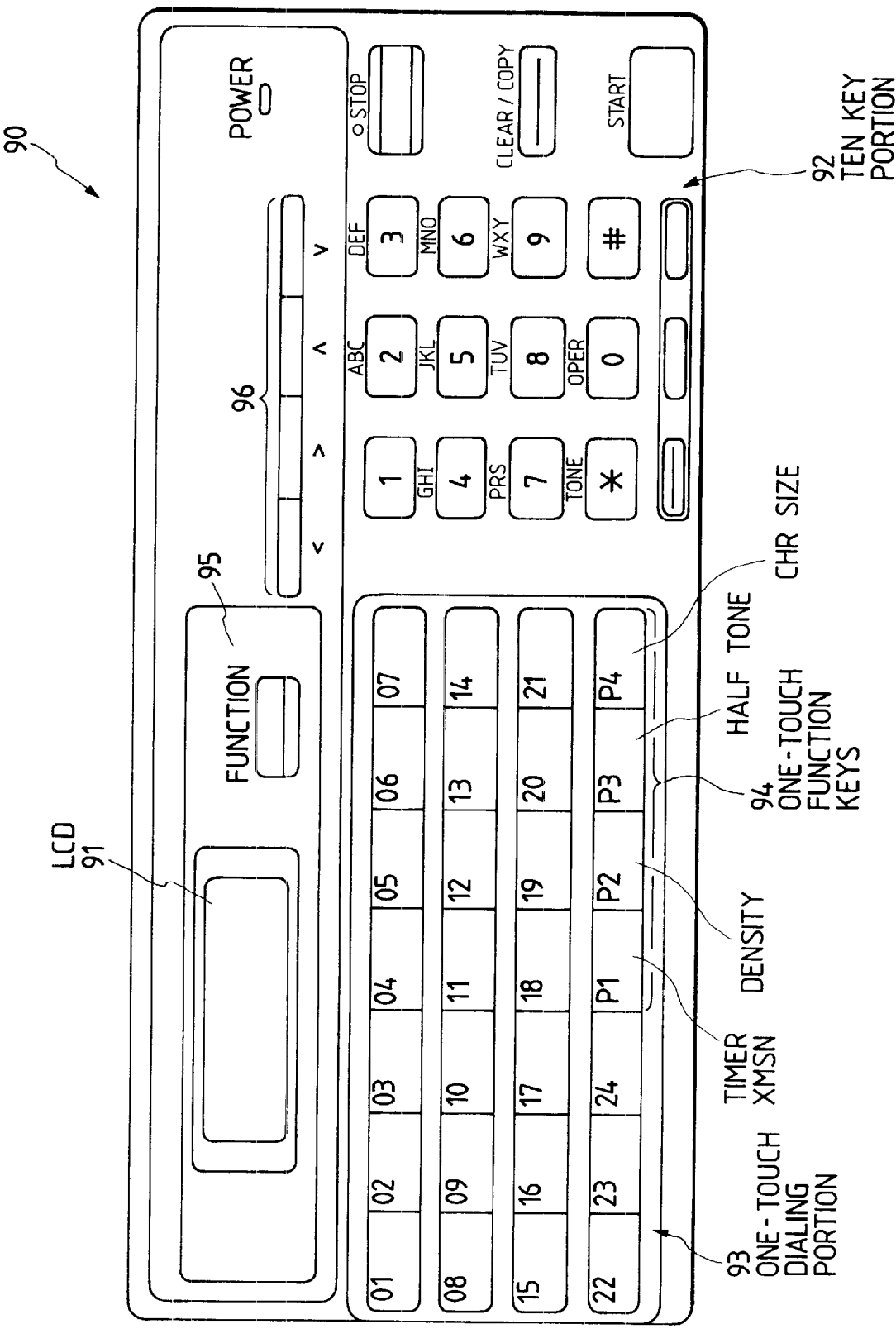

FIGS. 17A and 17B are illustrations of this embodiment showing an operation panel included in the operation portion 310 shown in FIG. 3 in the initial condition and a modified conditions respectively.

The operation panel 90 comprises a LCD (Liquid crystal display) 91, a ten key portion 92, a one-touch dialing portion 93, one-touch function keys 94, a function selection mode key 95, and function selection keys 96. These one-touch function keys 94 are assigned to functions which are considered to be frequently used from the statistical analysis at the initial condition. Functions which are considered to be infrequently used are selected by the function selection mode key 95, and function selection keys 96 incorporation with the LCD 91 where one of functions is displayed successively in response to the selection keys 96. In other words, this terminal fax 3 has many functions wherein the frequently used functions are assigned to the one-touch function keys 94 and other functions are selected by the function selection mode key 95 and the function selection keys 96.

These one-touch functions keys 94 are assigned to frequently used functions at the initial condition as mentioned above. However, it is possible to rearrange these one-touch function keys 94 in order of priority which is actually obtained from the historic data of the key operation as mentioned above. That is, the central fax service center 1 obtains total counts or frequencies of operation of respective functions keys and determines a new arrangement of one-touch function keys 94. The local fax service center 2 executes the rearrangement in accordance with the rearrangement data from the central fax service center 1. FIG. 17A shows the initial condition of one-touch function key arrangement wherein a function of the polling communication is assigned to a key denoted by "P1" and a communication management report function is assigned to a key denoted by "P2", keys denoted by "P3 and P4" are assigned as shown.

On the other hand, FIG. 17B shows the rearranged condition of one-touch function keys 94 wherein a function of timer transmission mode is assigned to a key denoted by "P1" and a density control function is assigned to a key denoted by "P2", keys denoted by "P3 and P4" are assigned as shown. When the rearrangement of the one-touch function keys 94 has been finished, the local fax service center 2 transmits a drawing showing the new arrangement of the one-touch function keys 94. The "polling", "communication controlling", "fine", and "stamp" mode functions shown in FIG. 17A are assigned to the function selection mode key 95 and the function selection keys 96. On the other hand, assignment of "timer transmission", "density", "halftone", and "character size" functions are moved from the function selection mode key 95 and the function selection keys 96.

FIG. 18 is an illustration of this embodiment showing a list of telephone numbers registered and assigned to respective one-touch dialing keys. The central fax service center 1 transmits telephone numbers to be registered as one-touch dialing telephone number, names of the communication partner corresponding respective telephone numbers, and transmission modes used with the respective telephone numbers which are obtained from the support service application as mentioned earlier to the local fax service center 2. The local fax service center 2 calls and transmits these data to a terminal fax 3 which sent the support service application. The terminal fax 3 receives and registers these data in the non-volatile memory 307 and prints out these data for the user. That is, for example, a telephone number "03-1234-5678 is assigned to a one-touch dialing key "1", and a name of the communication partner, "A FACTORY" and transmission modes "contrast: NORMAL/SIZE: FINE" are registered correspondingly printed.

FIG. 19 is an illustration of this embodiment showing a printed list of communication parter names arranged correspondingly to the one-touch dialing keys (buttons). Therefore, the user can set the printer list adjacent to the one-touch dialing keys as reference labels, though a scissors may be necessary.

Figure 20:
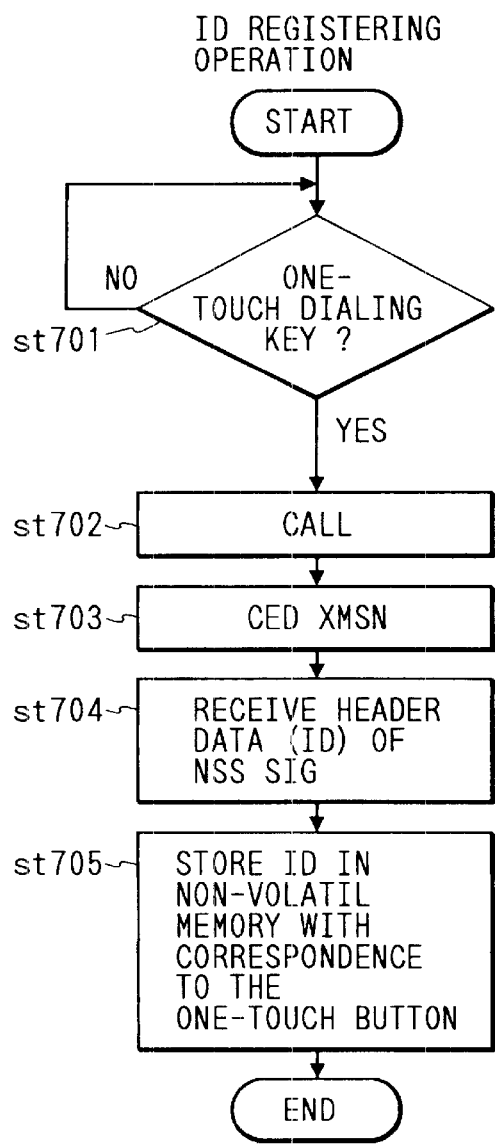
FIG. 20 shows a flow chart of this embodiment showing an operation of registering character ID data.

FIG. 20 shows a flow chart of this embodiment showing an operation of registering character ID data.

In step st701, the terminal fax 3 makes a decision as to whether or not a one-touch dialing key is depressed. If a one-touch dialing key is depressed, the terminal fax 3 calls a fax indicated by the registered telephone number according to the one-touch dialing key depressed in step st702. In the following step st703, the terminal fax 3 executes the facsimile procedure, that is, the terminal fax 3 executes a called station identification (CDE) communication in step st703. Then, the terminal fax 3 receives an NSS (non-standard facility setup) signal including character identification (ID) data of the called fax and extracts the character ID data from the NSS signal in step st704. The terminal fax 3 registers the character ID data included the NSS signal with a correspondence to the registered telephone number of the depressed one-touch dialing key in step st705.

Here, the user of the terminal fax 3 registers only a telephone number as a one-touch dialing key. When the user communicates with the fax using the one-touch dialing key, the character ID data of the called fax is registered automatically. Therefore, the registering operation is simple.

Figure 21:
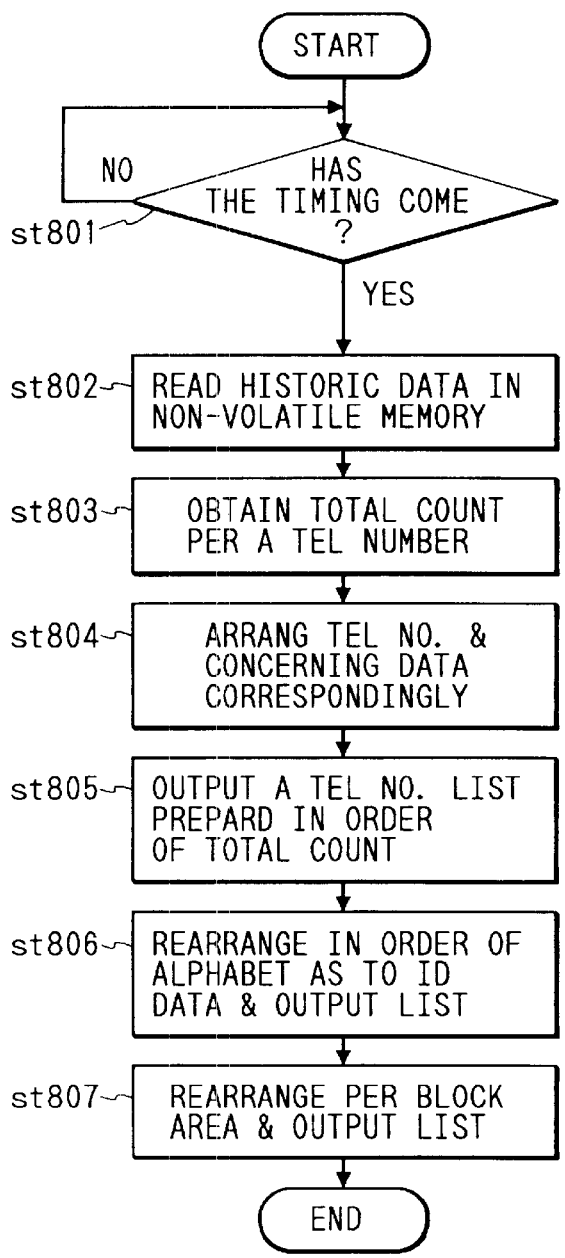
FIG. 21 shows a flow chart of this embodiment showing an output operation of a telephone number list.

FIG. 21 shows a flow chart of this embodiment showing an output operation of a telephone number list.

In step st801, the terminal fax 3 makes a decision as to whether or not the timing of outputting a telephone number list has come. If the timing has come, the terminal fax 3 reads out the historic data of operation in step st802. The terminal fax 3 calculates a total count per a telephone number used in step st803. In the following step st804, the terminal fax 3 stores and arranges the telephone numbers, character IDs, total counts, kind of keys used for transmission such as a one-touch dialing call, a shorted telephone number call, a ten key number call or the like respectively in the RAM 303 correspondingly. In the following step st805, the terminal fax 3 rearrange the data in the RAM 303 in order of the total count of calling and outputs the list of telephone numbers and concerning data in order of the total count of calling wherein the concerning data are character IDs, total counts, and kind of keys used for transmission. In the following step st806, the terminal fax 3 rearrange the data in the RAM 303 in order of alphabet as to the character ID data and outputs the list of telephone number and concerning data as a telephone list. In the following step st807, the terminal fax 3 rearranges the data in the RAM 303 to obtain a list arranged per block area and output the telephone list arranged per block area. FIGS. 23A, 23B, and 23C show telephone lists of this embodiment.

FIG. 23A shows a telephone list arranged in order of total count of communication per communication partner. FIG. 23B shows a telephone list arranged in order of alphabet as to names of communication partners. FIG. 23C shows a telephone list arranged per block area.

This processing can be charged to the local facsimile service center 2 in place of the terminal fax 3 to decrease an amount of program stored in the terminal fax 3. FIG. 22 shows a flow chart of this embodiment showing a telephone number list.

In step st901, a decision is made as to whether or not time of outputting a telephone list has, come. If the answer is YES, the local fax service center calls the terminal fax 3 and collects operational historic dat in the non-volatile memory 307 in the terminal fax 3 in step st902. Then, the local fax service center 2 calculates frequencies of communication per telephone number in step st903. The local fax service center 2 arrange the telephone numbers, concerned data such as name of partners, block areas in order of frequency, alphabet, and block area in the memory 103 to form telephone number lists in step st904 and transmits these lists as shown in FIGS. 23A to 23C to the terminal fax 3.

As mentioned, the telephone number list can be recorded out using the historic data stored in the non-volatile memory 307.

What is claimed is:

1. A facsimile communication system comprising:
    a facsimile apparatus comprising:
        image data communication means for communicating an image signal through a communication line in response to a command signal;
        an operation panel having at least a switch responsive to an operation by a user;
        command signal producing means for producing said command signal in response to said operation panel;
        detection means for detecting an occurrence of said command signal; and
        storing means responsive to said detection means for accumulating occurrences of said command signal as operational historic data indicative of said operation of said switch;
        data transmitting means responsive to a request command for transmitting said operational historic data; and
    a service center apparatus having:
        data receiving means for sending said request command and receiving said operational historic data; and
        analyzing means responsive to said receiving means for automatically analyzing said operational historic data from said data receiving means.

2. A facsimile communication system as claimed in claim 1, wherein said storage means stores historic data in a form other than facsimile information.

3. A facsimile communication system comprising:
    a facsimile apparatus comprising:
        image data communication means for communicating an image signal through a communication line in response to a command signal;
        an operation panel having at least a switch responsive to an operation by a user;
        command signal producing means for producing said command signal in response to said operation panel;
        detection means for detecting an occurrence of said command signal;
        storing means responsive to said detection means for accumulating occurrences of said command signal as operational historic data indicative of said operation of said switch; and
        data transmitting means responsive to a request command for transmitting said operational historic data; and
    a service center apparatus having:
        timer means for measuring time and detecting whether a predetermined timing has occurred;
        data transmitting means responsive to said timer means for sending said request command;
        data receiving means for sending said request command and receiving said operational historic data; and
        analyzing means for analyzing said operational historic data from said data receiving means.

4. A facsimile communication system as claimed in claim 3, wherein said data transmitting means transmits said operational historic data in a form other than facsimile information.

5. A facsimile communication system comprising:
    a facsimile apparatus having:
        first storing means for storing first control data;
        image data communication means responsive to a command signal for communicating an image signal in accordance with first control data through a communication line;
        an operation panel having at least a switch;
        command signal producing means for producing said command signal in response to operation of said switch;
        detection means for detecting an occurrence of said command signal;
        second storing means responsive to said detection means for accumulating occurrences of said command signal as operational historic data;
        first data transmitting means responsive to a request command for transmitting said historic data through a communication line; and
        first data receiving means for receiving second control data and storing said second control data in said first storing means as said first control data; and
    a service center apparatus having:
        second data receiving means for sending said request command and receiving said operational historic data;
        analyzing means for analyzing said operational historic data from said second data receiving means;
        control data producing means for producing third control data in accordance with a result of analyzing means; and
        second data transmitting means responsive to said control data producing means for transmitting said third control data to said first data receiving means as said second control data through said communication line.

6. A facsimile communication system as claimed in claim 5, wherein said first data transmitting means transmits said historic data in a form other than facsimile information.

7. A facsimile communication system as claimed in claim 8, wherein said data transmitting means transmits said historic data in a form other than facsimile information.

8. A facsimile communication system comprising:
    a facsimile apparatus having:
        image data communication means for communicating an image signal through a communication line in predetermined modes in accordance with respective command signals;
    an operation panel having switches operable by an operator;
        first storing means for storing first data indicative of correspondence between said command signals and said switches respectively;
        command signal producing means for producing said one of command signals in response to operation of one of said switches using said first data;
        detection means for detecting an occurrence of said command signals;
        second storing means responsive to said detection means for accumulating said occurrences of said command signals respectively as operational historic data;
        first data transmitting means responsive to a request command for transmitting said historic data through said communication line; and
        first data receiving means for receiving second data and storing said second data in said first storing means as said first data: and
    a service center apparatus comprising:
        second data receiving means for sending said request command and receiving said first control data from said first storing means and said operational historic data through said communication line;

analyzing means responsive to said second data receiving means for analyzing said operational historic data from said second data receiving means;

a data producing means for producing a third data in accordance with a result of analyzing means; and second data transmitting means responsive to said data producing means for transmitting said third data to said first data receiving means through said communication line as said second data, wherein said correspondence is controlled in accordance with said result.

9. A method of managing of a facsimile apparatus having image data communication means for communicating an image signal through a communication line in predetermined modes in accordance with command signals respectively; an operation panel having switches, operated by an operator; first storing means for storing first data indicative of correspondence between said command signals and said switches respectively; command signal producing means for producing said one of command signals in response to operated one of said switches using said first data; detection means for detecting an occurrence of said command signals; second storing means responsive to said detection means for accumulating said occurrences of said command signals respectively as operational historic data; first data transmitting means responsive to a request command for transmitting said historic data through said communication line; and receiving means for receiving second data and storing said second data in said first storing means as said first data, said method comprising the steps of:

transmitting said request command to said first data transmitting means through said communication line;

receiving said first control data from said first storing means and said operational historic data through said communication line;

analyzing said operational historic data from said second data receiving means;

producing a third data in accordance with a result of analyzing means; and transmitting said third data to said first data receiving means through said communication line as said second data, wherein said correspondence is controlled in accordance with said result.

10. A method as claimed in claim 9, wherein said historic data is transmitted through said communication line in a form other than facsimile information.

11. A facsimile communication system comprising:

a facsimile apparatus having:

image data communication means for communicating an image signal through a communication line in predetermined modes in accordance with respective command signals;

an operation panel having switches operable by an operator;

first storing means for storing first data, each of said first data corresponding to each of said switches and each of said predetermined modes;

command signal producing means for producing one of said command signals in response to operation of one of said switches using said first data such that said image data communication means is operated in one of said predetermined modes selected by one of said switches;

detection means for detecting an occurrence of said command signals;

second storing means responsive to said detection means for accumulating said occurrences of said command signals respectively as operational historic data;

first data transmitting means responsive to a request command for transmitting said historic data through said communication line; and first data receiving means for receiving second data and storing said second data in said first storing means as said first data;

a service center apparatus comprising;

second data receiving means for sending said request command and receiving said first control data from said first storing means and said operational historic data through said communication line;

analyzing means responsive to said second data receiving means for analyzing said operational historic data from said second data receiving means;

data producing for producing a third data in accordance with a result of analyzing means; and second data transmitting means responsive to said data producing means for transmitting said third data to said first data receiving means through said communication line as said second data;

wherein if said second data is stored in said first storing means as said first data and if said first data previously stored is different from said first data after said second data is stored in said first storing means, said image data communication means is operated in another one of said predetermined modes if the same one of said switch is operated before and after said second data is stored in said first storing means as said first data.

12. A method of managing of a facsimile apparatus having image data communication means for effecting image data communication in response to an operation in accordance with control data, first storing means for storing said control data, detecting means for detecting said operation, second storing means for accumulating occurrences of said operation as operational historic data, data transmission means for transmitting said operation historic data, said method comprising the steps of:

(a) receiving said operation historic data;

(b) analyzing said received operation historic data;

(c) producing second control data in accordance with a result of step (b); and (d) transmitting and storing said second control data in said first storing means as said first control data to control said operational condition.

13. A method as claimed in claim 12, wherein said data transmission means transmits said operation historic data in a from other than facsimile information.

14. A facsimile communication system comprising:

a facsimile apparatus having:

image data communication means responsive to a command signal for effecting communication of an image signal through a communication line;

detection means for detecting a result as to whether or not the communication of said image signal is a failure;

storing means for storing and accumulating said result as result data;

data transmitting means responsive to a request command for transmitting said result data; and a service center apparatus having:

timer means for measuring time;

data transmitting means responsive to said timer means for periodically sending said request command and receiving said result data; and analyzing means responsive to said receiving means for automatically analyzing said result data from said data receiving means;

wherein said data transmitting means transmits said result data in a form other than facsimile information.

* * * * *